US011903885B2

(12) United States Patent
Lee et al.

(10) Patent No.: US 11,903,885 B2
(45) Date of Patent: Feb. 20, 2024

(54) WHEELCHAIR ARMREST STORAGE SYSTEMS AND SUBASSEMBLIES

(71) Applicant: TOYOTA MOTOR NORTH AMERICA, INC., Plano, TX (US)

(72) Inventors: Christopher Paul Lee, Little Elm, TX (US); Douglas A. Moore, Fairview, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 1149 days.

(21) Appl. No.: 16/667,005

(22) Filed: Oct. 29, 2019

(65) Prior Publication Data

US 2021/0121344 A1 Apr. 29, 2021

(51) Int. Cl.

*A61G 5/10* (2006.01)
*E05B 65/52* (2006.01)
*A61G 5/12* (2006.01)

(52) U.S. Cl.

CPC ............... *A61G 5/10* (2013.01); *A61G 5/125* (2016.11); *E05B 65/5238* (2013.01); *E05B 65/5269* (2013.01)

(58) Field of Classification Search

CPC ...... A61G 5/10; A61G 5/125; E05B 65/5238; E05B 65/5269
USPC ........................................................ 280/304.1
See application file for complete search history.

(56) References Cited

U.S. PATENT DOCUMENTS

| | | | | | |
|---|---|---|---|---|---|
| 4,339,061 | A * | 7/1982 | Dunn | A61G 5/1094 224/407 |
| 4,730,869 | A * | 3/1988 | Schumacher | A61G 5/125 297/188.18 |
| 5,207,477 | A | 5/1993 | Maxwell | |
| 10,492,366 | B1 * | 12/2019 | Knudsen | A01D 75/008 |
| 2007/0262632 | A1 | 11/2007 | Cody et al. | |

FOREIGN PATENT DOCUMENTS

| | | |
|---|---|---|
| CN | 201888893 U | 7/2011 |
| CN | 202342319 U | 7/2012 |
| CN | 204932040 U | 1/2016 |

(Continued)

OTHER PUBLICATIONS

"FJ Cruiser Black Roll-Top Console Cover Jul. 2014." FJCruiserAccessory.com. Web. May 31, 2019. https://www.fjcruiseraccessory.com/fjcruisercenterconsolecover.html.

(Continued)

*Primary Examiner* — Kevin Hurley
*Assistant Examiner* — Felicia L. Brittman
(74) *Attorney, Agent, or Firm* — DINSMORE & SHOHL LLP

(57) ABSTRACT

A wheelchair armrest storage system may include a housing for a wheelchair, where: the housing includes a proximal portion, a distal portion, a first lateral side, and a second lateral side, the housing extends longitudinally between the proximal portion and the distal portion, and at least one cover receiving cavity is defined in each of the first lateral side and the second lateral side. The wheelchair armrest storage system may further include a storage area defined within the housing, and a cover configured to translate within each of the at least one cover receiving cavity defined in each of the first lateral side and the second lateral side.

20 Claims, 17 Drawing Sheets

(56) References Cited

FOREIGN PATENT DOCUMENTS

| | | | |
|---|---|---|---|
| DE | 102015219035 | A1 | 4/2017 |
| JP | 2006289012 | A | 10/2006 |

OTHER PUBLICATIONS

"Highlander center console box with retracting lid structure". Web. Accessed Sep. 6, 2019. http://s3.amazonaws.com/images.hollandersolutions.com/ABE/KAU/YWE/XIK/S.jpg.

* cited by examiner

WHEELCHAIR ARMREST STORAGE SYSTEMS AND SUBASSEMBLIES

BACKGROUND

Field

The present disclosure generally relates to wheelchair armrest storage systems and subassemblies, and more specifically, to wheelchair armrest storage systems and subassemblies including a cover configured to selectively open and close access to a storage area defined within each wheelchair armrest.

Technical Background

A wheelchair is often designed with a focus on maneuverability. For example, various components of the wheelchair may be configured to negotiate different terrain, to climb stairs, to move within a limited space, and/or the like. Too often, many practical needs of a wheelchair operator may be overlooked. For example, a wheelchair may be able to climb stairs, but that wheelchair may not include any compartment or area to store and/or to easily access personal items (e.g., keys, wallet, cell phone, and/or the like). In such an example, the wheelchair operator may resort to attaching a bag (e.g., backpack, seatback bag, side bag, pouch and/or the like), a device (e.g., cell-phone mount, cup holder, and/or the like) to a structure of the wheelchair. Unfortunately, however, the bag, the device, or the like may ultimately inhibit the wheelchair's designed maneuverability (e.g., bag(s) interfering with moving components, device placement obscuring wheelchair controls, and/or the like). Furthermore, if a wheelchair operator has limited arm mobility and/or arm strength, the wheelchair operator may not be able to practically access the bag, effectively utilize the device, or the like. Accordingly, wheelchair arrangements are desirable that include not only a storage area but also a way for wheelchair operators to easily open and close access to that storage area without interfering with wheelchair functionality.

SUMMARY

In one aspect, a wheelchair armrest storage system may include a housing for a wheelchair, where: the housing includes a proximal portion, a distal portion, a first lateral side, and a second lateral side, the housing extends longitudinally between the proximal portion and the distal portion, and at least one cover receiving cavity is defined in each of the first lateral side and the second lateral side. The wheelchair armrest storage system may further include a storage area defined within the housing, and a cover configured to translate within each of the at least one cover receiving cavity defined in each of the first lateral side and the second lateral side.

In another aspect, a wheelchair armrest storage system may include a housing for a wheelchair, where: the housing includes a proximal portion, a distal portion, a first lateral side, and a second lateral side, the housing extends longitudinally between the proximal portion and the distal portion, a plurality of cover receiving cavities are defined in a proximal portion of each of the first lateral side and the second lateral side, and a plurality of cover receiving cavities are defined in a distal portion of each of the first lateral side and the second lateral side. The wheelchair armrest storage system may further include a first storage area defined within the proximal portion of the housing, a first cover configured to translate within the plurality of cover receiving cavities defined in the proximal portion of each of the first lateral side and the second lateral side, a second storage area defined within the distal portion of the housing, and a second cover configured to translate within the plurality of cover receiving cavities defined in the distal portion of each of the first lateral side and the second lateral side.

In yet another aspect, a wheelchair armrest subassembly may include a wheelchair armrest storage system having a housing, where: the housing includes a proximal portion, a distal portion, a first lateral side, and a second lateral side, the housing extends longitudinally between the proximal portion and the distal portion, and at least one cover receiving cavity is defined in each of the first lateral side and the second lateral side. The wheelchair armrest storage system may further have a storage area defined within the housing, and a cover configured to translate within each of the at least one cover receiving cavity defined in each of the first lateral side and the second lateral side. The wheelchair armrest subassembly may be configured to couple to a wheelchair by attaching to an armrest of the wheelchair or by replacing the armrest of the wheelchair.

Additional features and advantages of the aspects described herein will be set forth in the detailed description which follows, and in part will be readily apparent to those skilled in the art from that description or recognized by practicing the aspects described herein, including the detailed description which follows, the claims, as well as the appended drawings.

It is to be understood that both the foregoing general description and the following detailed description describe various aspects and are intended to provide an overview or framework for understanding the nature and character of the claimed subject matter. The accompanying drawings are included to provide a further understanding of the various aspects, and are incorporated into and constitute a part of this specification. The drawings illustrate the various aspects described herein, and together with the description serve to explain the principles and operations of the claimed subject matter.

DETAILED DESCRIPTION

Figure 1:
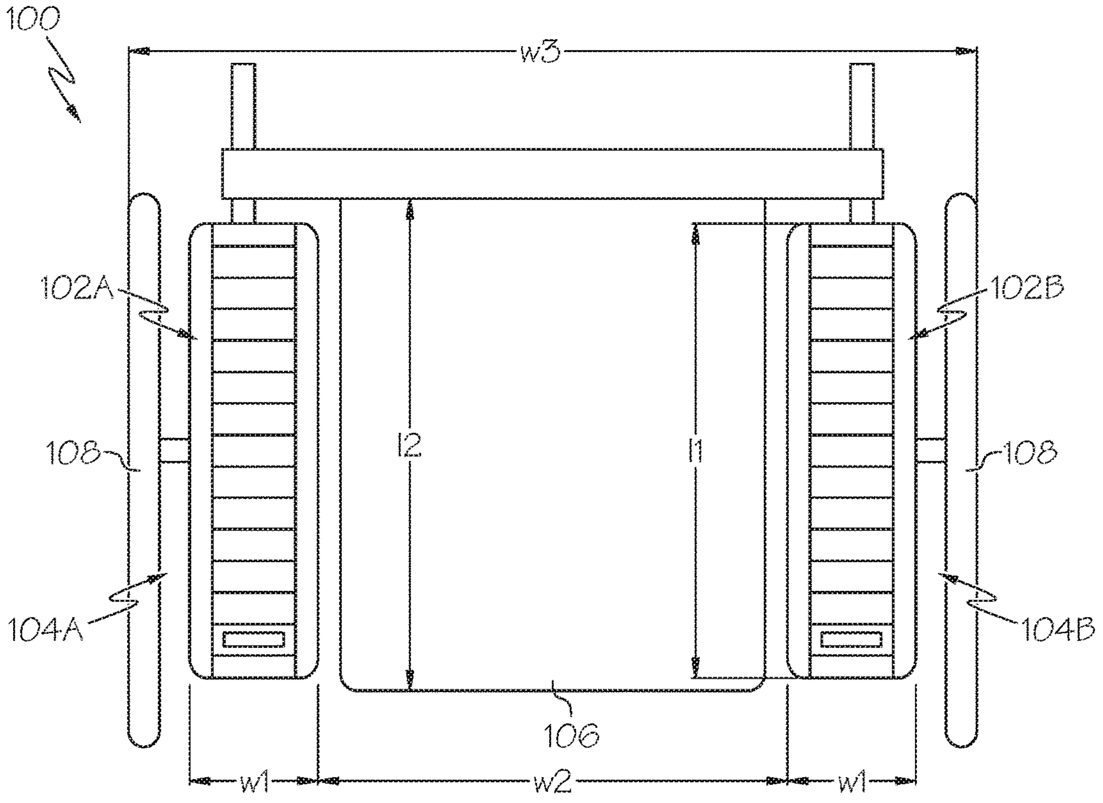
FIG. 1 depicts a top plan view of an illustrative wheelchair including a wheelchair armrest storage system on each arm, according to one or more embodiments shown and described herein.

Reference will now be made in detail to various wheelchair armrest storage systems that include an armrest housing (e.g., generally referred to "housing" herein) that defines a storage area and an armrest cover that interacts with the housing in particular ways to open and to close access to the storage area. According to various aspects described herein, the housing may be positioned proximally, centrally, or distally along one or more than one armrest (e.g., arm) of a wheelchair as illustrated in the accompanying drawings. Whenever possible, the same reference numerals will be used throughout the drawings to refer to the same or like parts.

According to various aspects of the present disclosure, the wheelchair armrest storage systems described herein may be integrated into the wheelchair itself. In some aspects, the wheelchair armrest storage systems may be defined within a structure of an arm(s) of the wheelchair. In other aspects, the wheelchair armrest storage systems may further define the structure of the arm(s) of the wheelchair. In yet further aspects, the wheelchair armrest storage systems may be integrated into an arm(s) configured to replace an existing arm(s) of a wheelchair. According to other aspects of the present disclosure, the wheelchair armrest storage systems described herein may be attachable to an existing arm(s) of a wheelchair. Such various aspects are illustrated in the accompanying drawings.

FIG. 1 depicts a top plan view of an illustrative wheelchair 100 including an armrest storage system 102A, 102B on each arm 104A, 104B of the wheelchair 100, according to various aspects described herein. Referring to FIG. 1, an armrest storage system width "w1" of each armrest storage system 102A, 102B may be based on a seat width "w2" of a seat 106 between the armrest storage systems 102A, 102B. According to various aspects, the seat width "w2" may be a standard seat width such as 16" (e.g., a relatively narrow adult width), 18" (e.g., an average adult width), or 20" (e.g., a relatively wide adult width). According to other aspects, the seat width "w2" may be an oversized seat width (e.g., a width greater than 20" in 2" increments). According to yet further aspects, the seat width "w2" may be a customized seat width (e.g., a width as narrow as 8" to wider than 28", a width greater than 8" in 1" increments, and/or the like).

Referring still to FIG. 1, the armrest storage system width "w1" of each armrest storage system 102A, 102B may be further based on an overall wheelchair width "w3". According to various aspects, the overall wheelchair width "w3" may be a standard overall width such as 27" or 30". According to some aspects, the overall wheelchair width "w3" may be greater than or equal to 21" (e.g., a narrow, light-weight wheelchair) to less than or equal to 40" (e.g., a wide, heavy-weight wheelchair). According to various aspects, the overall wheelchair width "w3" may be less than or equal to 36" (e.g., a standard entry door width).

In some aspects, each seat width "w2" may correspond with the overall wheelchair width "w3". For example, the overall wheelchair width "w3" may be 9" wider than the seat width "w2" (e.g., a 27" wide wheelchair with an 18" wide seat). Accordingly, in such aspects, about 4.5" remains on each side of the seat 106 to accommodate each armrest storage system 102A, 102B and other wheelchair components (e.g., wheels 108). According to various aspects, the seat width "w2" may correspond with an overall wheelchair width "w3" such that each armrest storage system 102A, 102B has a predetermined armrest storage system width "w1". In some aspects, the predetermined armrest storage system width "w1" may correspond to one or more items likely to be stored in the armrest storage system 102A, 102B. In one aspect, for example, the armrest storage system width "w1" may correspond to a cell phone width or length (e.g., to store about a 3" wide cell phone). In other aspects, the armrest storage system width "w1" may correspond to other accessory widths (e.g., to accommodate a wireless charging unit (e.g., cell phone) integrated into the armrest storage system, and/or the like).

Similarly, referring still to FIG. 1, an armrest storage system length "l1" may be based on a seat length "l2" of the seat 106. In some aspects, the seat length "l2" may be a standard seat length. In other aspects, the seat length "l2" may be a customized seat length (e.g., based on a measurement between a back of the wheelchair operator's pelvis to a back of the wheelchair operator's shins when sitting with lower legs at 90° relative to the upper legs, ±1-2"). In view of FIG. 1, the armrest storage system length "l1" may be less than the seat length "l2". In other aspects, the armrest storage system length "l1" may be equal to or greater than the seat length "l2". In yet further aspects, the armrest storage system length "l1" may be a predetermined armrest storage system length "l1".

Figure 2A:
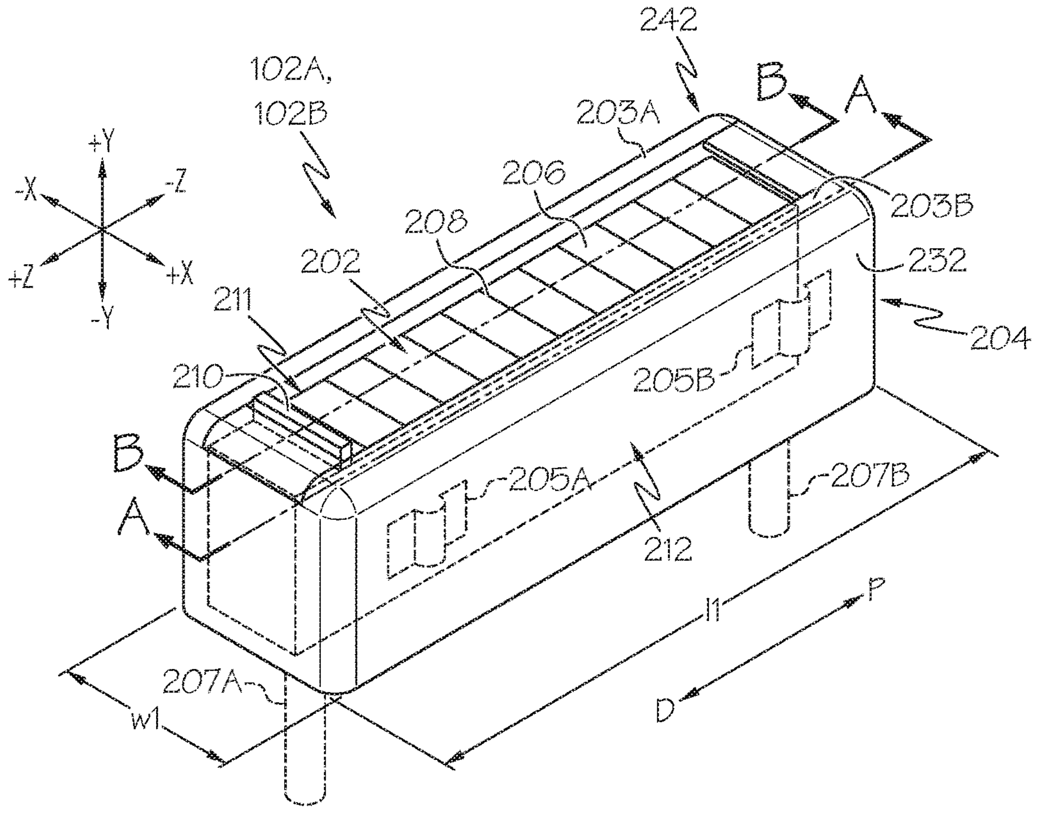
FIG. 2A depicts a perspective view of the illustrative armrest storage system of FIG. 1, according to one or more embodiments shown and described herein.

FIG. 2A depicts a perspective view of the illustrative armrest storage system 102A, 102B of FIG. 1, according to various aspects described herein. Referring to FIG. 2A, each armrest storage system 102A, 102B may include a cover 202, and a housing 204. The housing 204 may have a width "w1" and a length "l1". A top surface (e.g., in the +y direction of the coordinate axes of FIG. 2A) of the housing 204 may include a pad 203A, 203B on either side (e.g., in the −x and +x direction of the coordinate axes of FIG. 2A) of the cover 202 for wheelchair operator comfort and to bear forces pertinent to a wheelchair armrest. According to various aspects, the armrest storage systems described herein may be integrated into a wheelchair itself, defined within a structure of a wheelchair arm(s) and/or define the structure of the wheelchair arm(s) (e.g., wheelchair specifically designed, customized and/or ordered with the armrest storage systems described herein). According to other aspects, the armrest storage systems described herein may be configured to attach to an existing wheelchair armrest (e.g., brackets 205A, 205B, depicted in phantom as optional). According to yet further aspects, the armrest storage systems described herein may be configured to replace an existing wheelchair armrest when removed (e.g., wheelchair frame tubes 207A, 207B, depicted in phantom as optional). Accordingly, the armrest storage systems described herein may include a subassembly configured for attachment (e.g., as an add-on) to an existing wheelchair such that the features and functionalities described herein are realizable via any wheelchair.

Referring to FIG. 2A, according to various aspects, the cover 202 may be defined by a plurality of segments 206. In some aspects, each segment of the plurality of segments 206 may be coupled to an adjacent segment (e.g., in a manner similar to a roll-top desk and/or tambour door) to form the cover 202. In such aspects, each joint 208 between adjacent segments is configured to stiffen and/or provide structure to the cover 202. This stiffening and/or structure permits the armrest storage system 102A, 102B to bear the forces pertinent to a wheelchair armrest. Further in view of FIG. 2A, the cover 202 may include an actuator 210 (e.g., protrusion in the +y direction of the coordinate axes of FIG. 2A) positioned near a first end 211 of the cover 202. The actuator 210 may be configured to translate the cover 202 proximally (e.g., in a proximal "P" direction, in the −z direction of the coordinate axes of FIG. 2A) and/or distally (e.g., in a distal "D" direction, in the +z direction of the coordinate axes of FIG. 2A). More specifically, the actuator 210, when translated in the proximal "P" direction, may open access to and/or reveal the storage area 212 (e.g., depicted via phantom lines) defined by the housing 204 and, when translated in the distal "D" direction, may close access to and or conceal the storage area 212. Here, according to alternative aspects, it should be understood that the actuator 210 may be positioned proximally and the cover 202 may be configured to translate in the distal "D" direction to open access to and/or reveal the storage area 212 and in the proximal "P" direction to close access to and/or conceal the storage area 212.

Figure 2B:
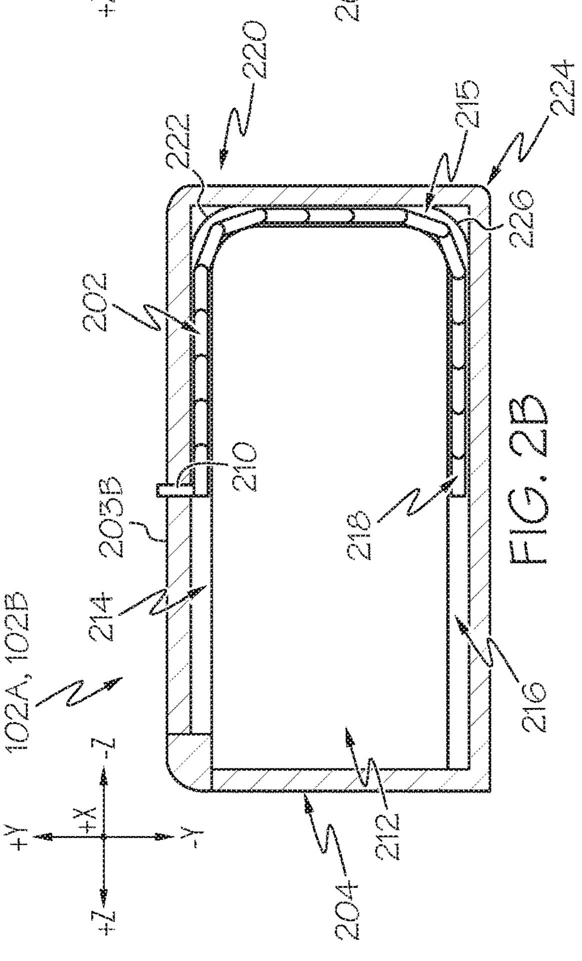
FIG. 2B depicts a cross-sectional view, along axis A-A, of the illustrative armrest storage system of FIG. 2A, where a cover is retractable in a first way, according to one or more embodiments shown and described herein.

FIG. 2B depicts a cross-sectional view, along axis A-A, of the illustrative armrest storage system 102A, 102B of FIG.

2A, where the cover 202 is retractable in a first way, according to various aspects described herein. In view of FIG. 2B, a first cover receiving cavity 214 may be defined in a top portion (e.g., in the +y direction of the coordinate axes of FIG. 2B) of the housing 204 (e.g., below the pad 203B), a second cover receiving cavity 215 may be defined in a proximal portion (e.g., in the −z direction of the coordinate axes of FIG. 2B) of the housing 204 and a third cover receiving cavity 216 may be defined in a bottom portion (e.g., in the −y direction of the coordinate axes of FIG. 2B) of the housing 204. Here, it should be understood that the first cover receiving cavity 214, the second cover receiving cavity 215, and the third cover receiving cavity may be similarly defined in both a first lateral side 232 and a second lateral side 242 of the housing 204. According to various aspects, the first cover receiving cavity 214, the second cover receiving cavity 215, and/or the third cover receiving cavity may define the storage area 212. Viewing FIG. 2B in light of FIG. 2A, when the cover 202 is translated (e.g., via actuator 210) proximally (i.e., in the −z direction of the coordinate axes of FIG. 2B) a second end 218 of the cover 202 translates from the first cover receiving cavity 214, through the communicatively coupled second cover receiving cavity 215, and into the communicatively coupled third cover receiving cavity 216. Accordingly, the first cover receiving cavity 214, the second cover receiving cavity 215, and the third cover receiving cavity 216 may function as a carrier or track for the cover 202. According to aspects described herein, the cover 202 may enter the second cover receiving cavity 215 at a first end 220 (e.g., in the +y direction of the coordinate axes of FIG. 2B). The first end 220 of the second cover receiving cavity 215 may define an entry curvature 222 to direct the second end 218 of the cover 202 into and through the second cover receiving cavity 215. A second end 224 of the second cover receiving cavity 215 may define a connecting curvature 226 to direct the second end 218 of the cover 202 into and through the third cover receiving cavity 216.

Figure 2C:
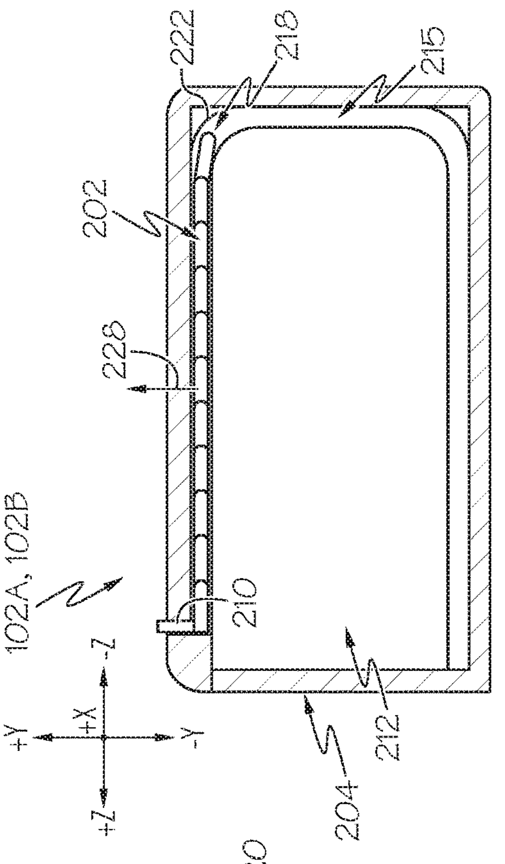
FIG. 2C depicts the cross-sectional view, along axis A-A, of the illustrative armrest storage system of FIG. 2B, where the cover is in a fully closed position and where the cover is removable from the housing in a first way, according to one or more embodiments shown and described herein.

FIG. 2C depicts the cross-sectional view, along axis A-A, of the illustrative armrest storage system 102A, 102B of FIG. 2B, where the cover 202 is in a fully closed position, according to various aspects described herein. In view of FIG. 2C, in the fully closed position, the second end 218 of the cover 202 may be positioned to clear the entry curvature 222 of the second cover receiving cavity 215 such that the cover 202 is removable from the housing 204 (e.g., as depicted by arrow 228 of FIG. 2C). Removability of the cover 202 (e.g., via actuator 210) enables the wheelchair operator to clean the cover 202, clean the storage area 212, and/or gain full access and/or optional use of the storage area 212 defined by the housing without obstruction by the cover 202. The cover 202 may then be selectively re-installed within the housing 204.

Figure 2D:
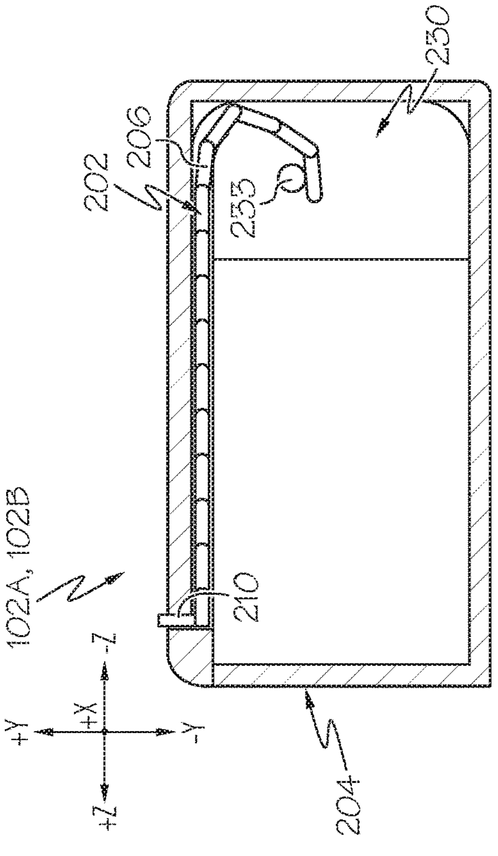
FIG. 2D depicts a cross-sectional view, along axis A-A, of the illustrative armrest storage system of FIG. 2A, where the cover is retractable in a second way, according to one or more embodiments shown and described herein.

FIG. 2D depicts a cross-sectional view, along axis A-A, of the illustrative armrest storage system 102A, 102B of FIG. 2A, where the cover 202 is retractable in a second way, according to various aspects described herein. Referring to FIG. 2D, a spool cavity 230 may be defined in the proximal portion (e.g., in the −z direction of the coordinate axes of FIG. 2D) of the housing 204. In particular, a spool wheel 233 mounted within the spool cavity 230 may be configured to spool the plurality of segments 206 as the cover 202 is translated (e.g., via the actuator 210) proximally (e.g., in the −z direction of the coordinate axes of FIG. 2D). In some aspects, the spool wheel 233 may include a spring (not shown) configured to rotationally assist the spooling of the plurality of segments 206. In some aspects, in light of FIG. 2A, a spool track (not shown, e.g., spiraling shape) may be defined in a first lateral side 232 (e.g., in the +x direction of the coordinate axes of FIG. 2A) and a second lateral side 242 (e.g., in the −x direction of the coordinate axes of FIG. 2A) of the housing 204 to guide the cover as it spools.

Figure 2E:
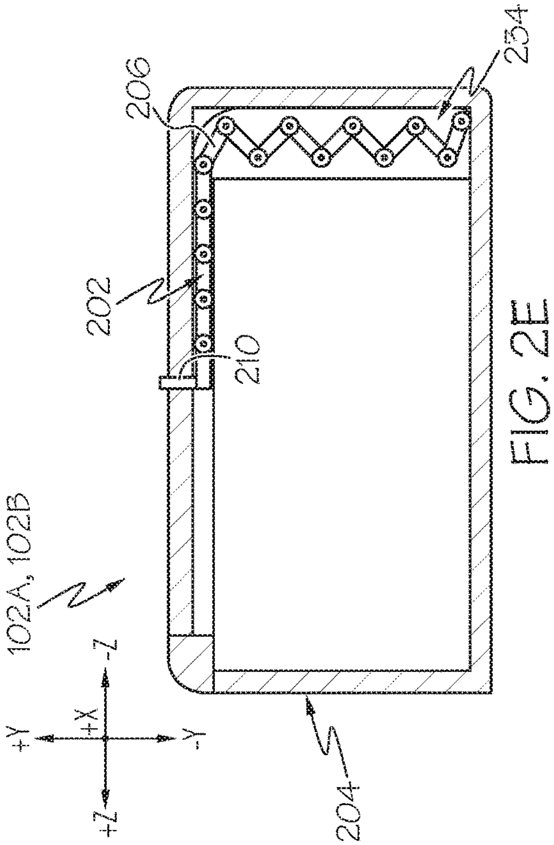
FIG. 2E depicts a cross-sectional view, along axis A-A, of the illustrative armrest storage system of FIG. 2A, where the cover is retractable in a third way, according to one or more embodiments shown and described herein.

FIG. 2E depicts a cross-sectional view, along axis A-A, of the illustrative armrest storage system 102A, 102B of FIG. 2A, where the cover 202 is retractable in a third way, according to various aspects described herein. Referring to FIG. 2E, a stacking cavity 234 may be defined in the proximal portion (e.g., in the −z direction of the coordinate axes of FIG. 2E) of the housing 204. In such an aspect, as the cover 202 is translated (e.g., via the actuator 210) proximally (e.g., in the −z direction of the coordinate axes of FIG. 2E) the plurality of segments 206 may be configured to stack upon one another within the stacking cavity 234.

Figure 2F:
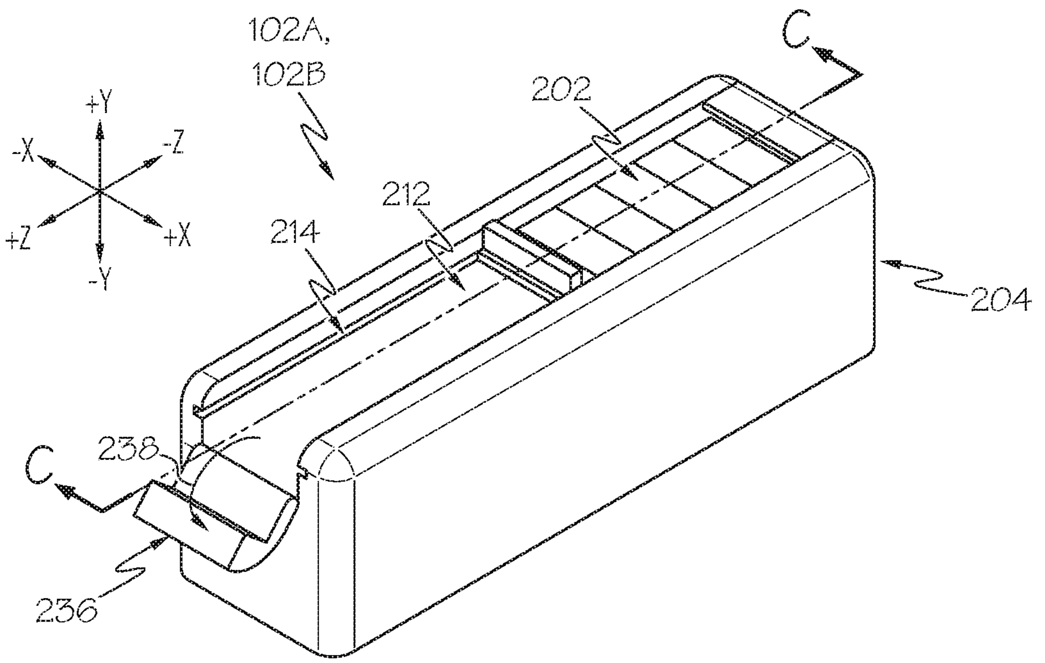
FIG. 2F depicts a perspective view of the illustrative armrest storage system of FIG. 2A, where the cover is removable from the housing in a second way, according to one or more embodiments shown and described herein.
Figure 2G:
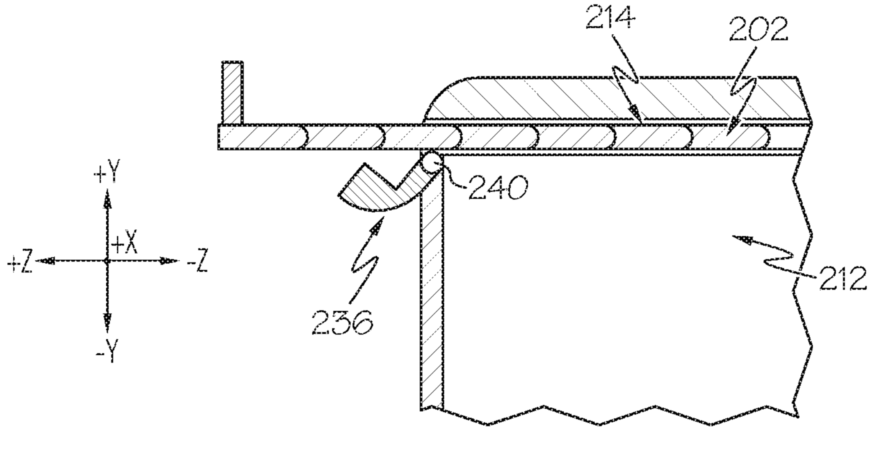
FIG. 2G depicts a portion of a cross-sectional view, along axis C-C, of the illustrative armrest storage system of FIG. 2F, according to one or more embodiments shown and described herein.

FIG. 2F depicts a perspective view of the illustrative armrest storage system 102A, 102B of FIG. 2A, where the cover 202 is removable from the housing 204 in a second way, according to various aspects described herein. Referring to FIG. 2F, a distal portion (e.g., in the +z direction of the coordinate axes of FIG. 2F) of the housing 204 may include a flip down portion 236. In view of FIG. 2F, the flip down portion 236 may rotate out and down (e.g., as depicted by arrow 238 in the +z and −y direction of the coordinate axes of FIG. 2F) such that a distal end (e.g., in the +z direction of the coordinate axes of FIG. 2F) of the first cover receiving cavity 214 is exposed to allow removal of the cover 202. FIG. 2G depicts a portion of a cross-sectional view, along axis C-C, of the illustrative armrest storage system 102A, 102B of FIG. 2F, according to various aspects described herein. Referring to FIG. 2G, the flip down portion 236 may be rotatable about a joint 240. According to various aspects, the joint 240 may be a hinge. In view of FIG. 2G, after rotation of the flip down portion 236, the cover 202 may be conveniently extracted from the first cover receiving cavity 214 to enable the wheelchair operator to clean the cover 202, clean the storage area 212 (e.g., FIG. 2F), and/or gain full access and/or optionally use of the storage area 212 defined by the housing without obstruction by the cover 202. The cover 202 may then be selectively re-installed within the housing 204 by sliding the cover 202 back into the distal end of the first cover receiving cavity 214 and rotating the flip down portion 236 up and in (e.g., opposite arrow 238 in the +y and −z direction of the coordinate axes of FIG. 2F) to close access to the distal end of the first cover receiving cavity 214 to retain the cover 202.

Figure 3A:
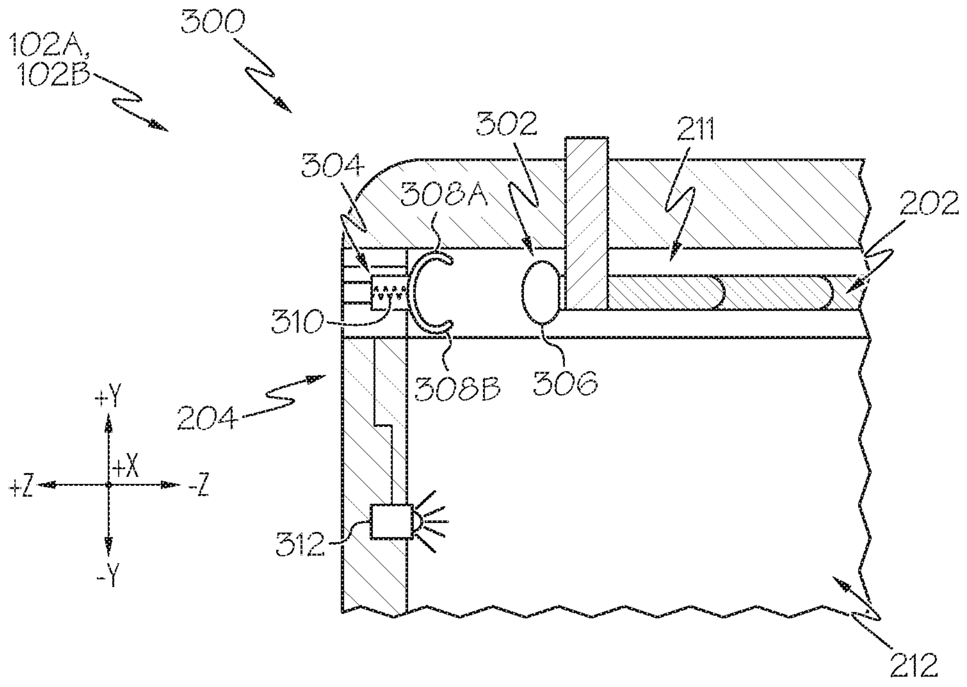
FIG. 3A depicts a portion of a cross-sectional view, along axis B-B, of the illustrative armrest storage system of FIG. 2A, where the cover includes a first lock mechanism, according to one or more embodiments shown and described herein.

FIG. 3A depicts a portion of a cross-sectional view, along axis B-B, of the illustrative armrest storage system 102A, 102B of FIG. 2A, where the cover 202 includes a first lock mechanism 300, according to various aspects described herein. Referring to FIG. 3A, the first end 211 of the cover 202 may further include a first lock portion 302 of the first lock mechanism 300 and a distal portion (e.g., in the +z direction of the coordinate axes of FIG. 3A) of the housing 204 may include a second lock portion 304 of the first lock mechanism 300. The first lock portion 302 may include a protrusion 306 configured to insertably interface with receiving arms 308A, 308B of the second lock portion 304. In some aspects, the second lock portion 304 may include a spring mechanism 310 configured to, after a first compression (e.g., in the +z direction of the coordinate axes of FIG. 3A), lock the protrusion 306 within the receiving arms 308A, 308B, and, after a second compression (e.g., in the +z direction of the coordinate axes of FIG. 3A), release the protrusion 306 from the receiving arms 308A, 308B. In some aspects, the housing 204 may further include a light emitter 312. The light emitter 312 may be configured to illuminate the storage area 212 when the cover 202 is opened or retracted. In such aspects, the first lock mechanism 300 may be configured to selectively turn the light emitter 312 on and off. In some aspects, the second lock portion 304 may be configured to turn the light emitter 312 on after the protrusion 306 is released from its receiving arms 308A, 308B and to turn the light emitter 312 off after the protrusion 306 is locked within its receiving arms 308A, 308B.

Figure 3B:
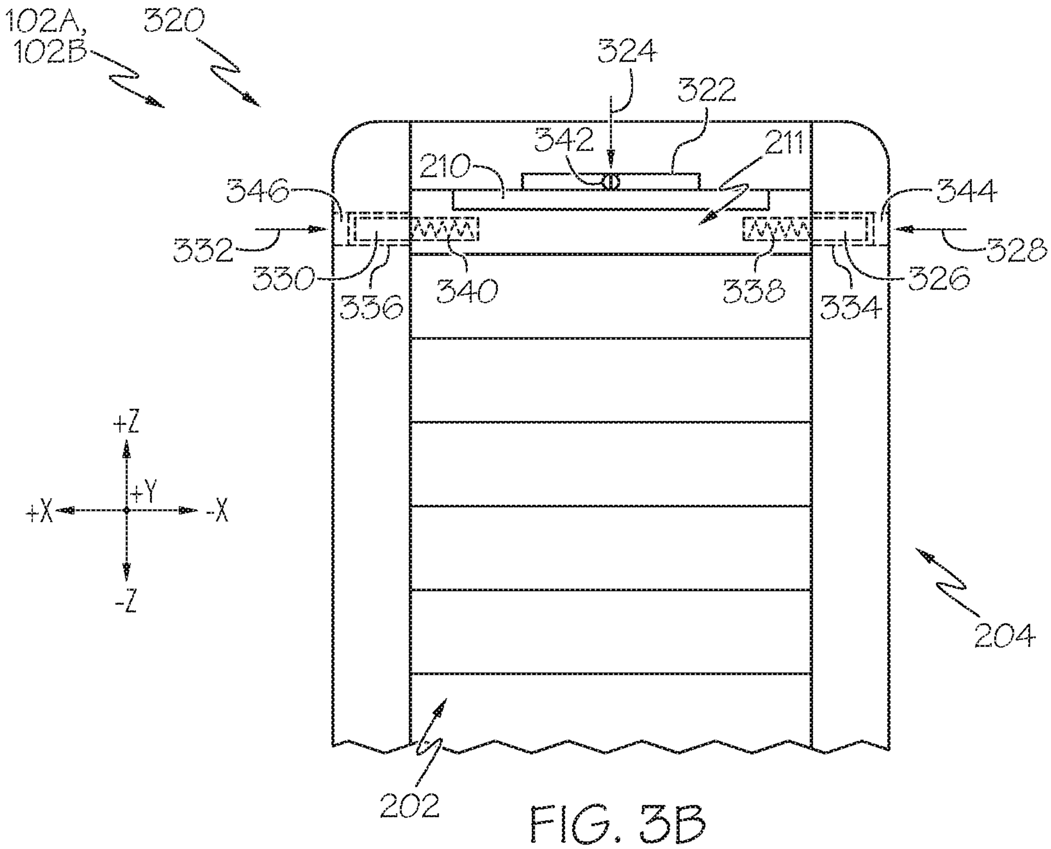
FIG. 3B depicts a portion of a top plan view of the illustrative armrest storage system of FIG. 2A, where the cover includes a second lock mechanism, according to one or more embodiments shown and described herein.

FIG. 3B depicts a portion of a top plan view of the illustrative armrest storage system 102A, 102B of FIG. 2A, where the cover 202 includes a second lock mechanism 320, according to various aspects described herein. Referring to FIG. 3B, the first end 211 of the cover 202 may further include a lock actuator 322 of the second lock mechanism 320. In some aspects, the lock actuator 322 may be integrated with the cover's actuator 210. In other aspects, the lock actuator 322 may be separate from the cover's actuator 210. In view of FIG. 3B, the lock actuator 322 may be configured to, after actuation (e.g., as depicted by arrow 324, in the −z direction of the coordinate axes of FIG. 3B), cause a first lock pin 326 of the lock actuator 322 to translate inward (e.g., as depicted by arrow 328, in the +x direction of the coordinate axes of FIG. 3B) and a second lock pin 330 of the lock actuator 322 to translate inward (e.g., as depicted by arrow 332, in the −x direction of the coordinate axes of FIG. 3B). In such aspects, a first lock pin cavity 334 (e.g., depicted in phantom in FIG. 3B) of the second lock mechanism 320 may be defined in the housing 204 to receive the first lock pin 326 and a second lock pin cavity 336 (e.g., depicted in phantom in FIG. 3B) of the second lock mechanism 320 may be defined in the housing 204 to receive the second lock pin 330. In view of FIG. 3B, a first spring mechanism 338 may be configured to translate the first lock pin 326 to a default outward position (e.g., in the −x direction of the coordinate axes of FIG. 3B) and a second spring mechanism 340 may be configured to translate the second lock pin 330 to a default outward position (e.g., in the +x direction of the coordinate axes of FIG. 3B). Further in view of FIG. 3B, the lock actuator 322 may further include a key lock 342 configured to, in a first unlocked position, permit inward translation of the first lock pin 326 and the second lock pin 330, as described herein, and in a second locked position, prohibit inward translation of the first lock pin 326 and the second lock pin 330 to effectively secure the cover 202 in the closed position (e.g., as depicted in FIG. 3B) and to prevent access to the storage area 212 and/or contents of the storage area 212. Furthermore, similar to FIG. 3A, the second lock mechanism 320 may be configured to selectively turn a light emitter (e.g., light emitter 312 of FIG. 3A) on and off. In some aspects, the second lock mechanism 320 may be configured to turn the light emitter on after the first lock pin 326 and the second lock pin 330 are translated inward and to turn the light emitter off after the first lock pin 326 and the second lock pin 330 are translated outward. In some aspects, the first lock pin cavity 334 may include a first switch 344 configured to turn the light emitter off when actuated by the first lock pin 326 and to turn the light emitter on when not actuated by the first lock pin 326 and/or the second lock pin cavity 336 may include a second switch 346 configured to turn the light emitter off when actuated by the second lock pin 330 and to turn the light emitter on when not actuated by the second lock pin 330. Here it should be understood that other aspects, as described herein, may include a locking mechanism (e.g., the first lock mechanism 300, the second lock mechanism 320, and/or the like).

Figure 4B:
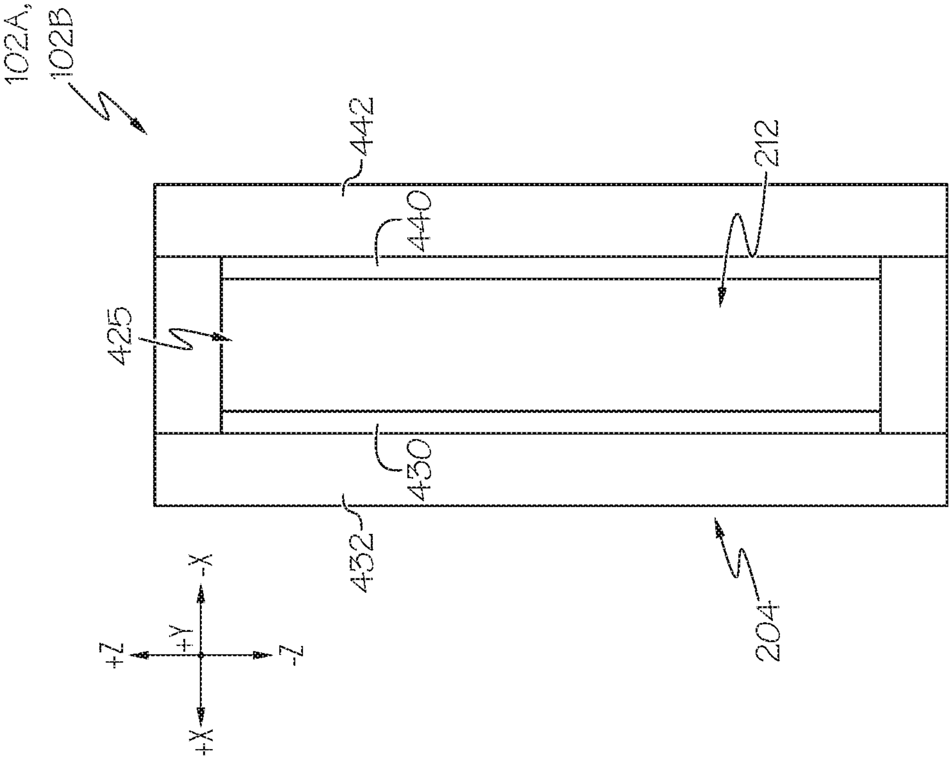
FIG. 4B depicts a top plan view of the illustrative armrest storage system of FIG. 2A configured for the first style of cover of FIG. 4A, according to one or more embodiments shown and described herein.
Figure 4A:
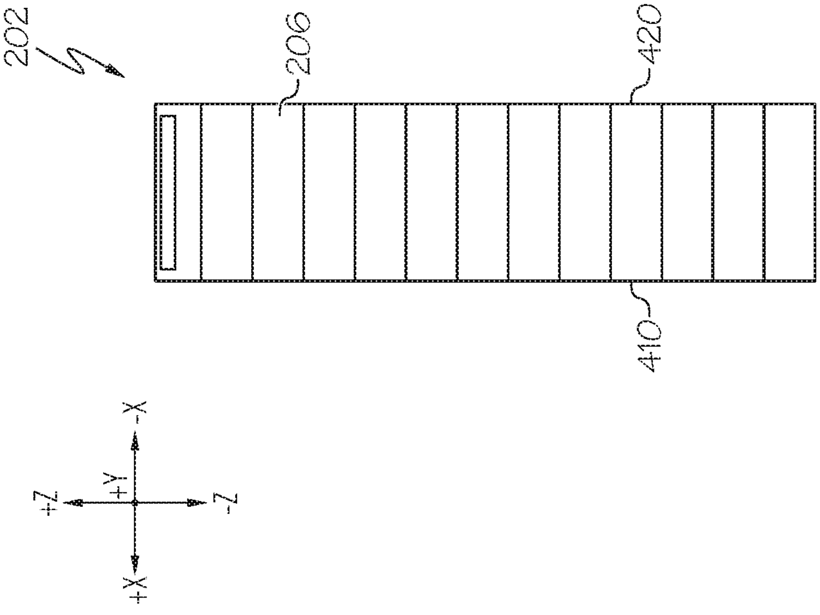
FIG. 4A depicts a top plan view of a first style of cover, according to one or more embodiments shown and described herein.

FIG. 4A depicts a top plan view of a first style of cover 202, according to various aspects described herein. The first style of cover 202, similar to as described herein, may be defined by a plurality of coupled segments 206. Referring to FIG. 4A, each of the plurality of segments 206 that define a first lateral edge 410 (e.g., in the +x direction of the coordinate axes of FIG. 4A) of the first style of cover 202 and a second lateral edge 420 (e.g., in the −x direction of the coordinate axes of FIG. 4A) of the first style of cover 202, may not include a protrusion(s) configured to interact with one or more than one cover receiving cavity (e.g., the first cover receiving cavity 214, the second cover receiving cavity 215 and/or the third cover receiving cavity 216 as described herein).

FIG. 4B depicts a top plan view of the illustrative armrest storage system 102A, 102B of FIG. 2A configured for the first style of cover 202 of FIG. 4A, according to various aspects described herein. As described in FIG. 2B, the housing 204 may define one or more than one cover receiving cavity (e.g., the first cover receiving cavity 214, the second cover receiving cavity 215 and/or the third cover receiving cavity 216) that may function as a carrier or track for the cover 202. Referring to FIG. 4B, according to various aspects, the one or more than one cover receiving cavity may be defined, in part, by a first flange 430 on a first lateral side 432 (e.g., in the +x direction of the coordinate axes of FIG. 4B) of the housing 204 and a second flange 440 on a second lateral side 442 (e.g., in the −x direction of the coordinate axes of FIG. 4B) of the housing 204. In view of FIG. 4B, the first flange 430 may extend (e.g., in the −x direction of the coordinate axes of FIG. 4B) into an opening 425 defined in a top surface (e.g., in the +y direction of the coordinate axes of FIG. 4B) of the housing 204 and the second flange 440 may extend (e.g., in the +x direction of the coordinate axes of FIG. 4B) into the opening 425 defined in the top surface of the housing 204. The opening 425 may provide access to the storage area 212. Referring briefly to FIG. 2B, the first flange 430 and the second flange 440 may extend into one another at the proximal portion (e.g., in the −z direction of the coordinate axes of FIG. 2B) and at the bottom portion (e.g., in the −y direction of the coordinate axes of FIG. 2B) of the housing 204 to define a surface to interface with the first style of cover 202 and to define the storage area 212. According to various aspects, the first flange 430 and the second flange 440 may be configured to, in combination with the first style of cover 202 (e.g., when installed), bear forces pertinent to a wheelchair armrest. In particular, referring briefly to FIG. 4A, a bottom surface (e.g., in the −y direction of the coordinate axes of FIG. 4A) along the first lateral edge 410 and the second lateral edge 420 of the first style of cover 202 may slidingly interface with the first flange 430 and the second flange 440 of the housing. Furthermore, referring briefly to FIG. 2C, the armrest storage system 102A, 102B of FIG. 4B, configured for the first style of cover 202 of FIG. 4A, may permit the cover 202 to be selectively removed and/or installed when the cover is in its fully closed positon.

Figures 5A, 5B, 5C:
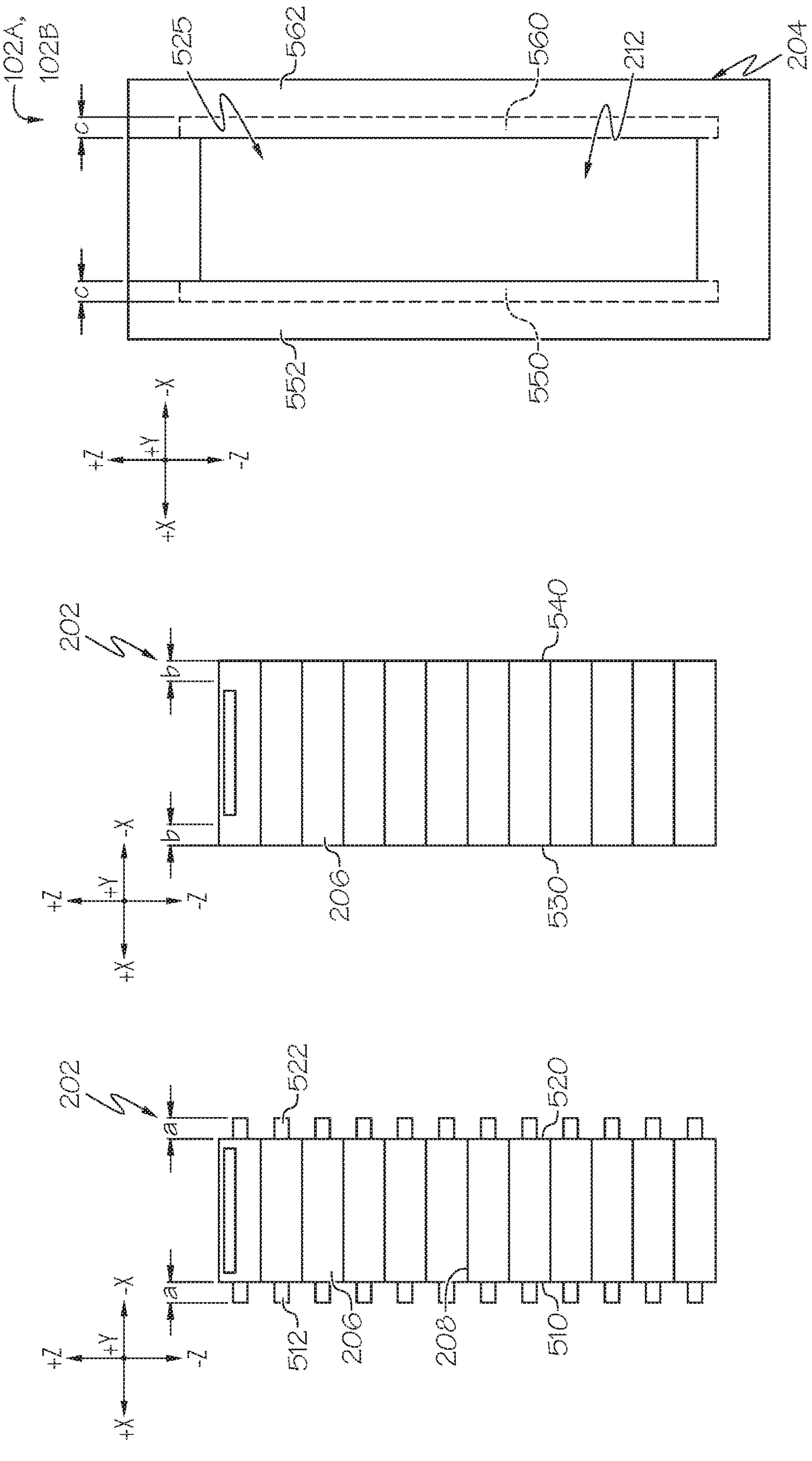
FIG. 5A depicts a top plan view of a second style of cover, according to one or more embodiments shown and described herein.
FIG. 5B depicts a top plan view of a third style of cover, according to one or more embodiments shown and described herein.
FIG. 5C depicts a top plan view of the illustrative armrest storage system of FIG. 2A configured for the second style of cover of FIG. 5A and/or the third style of cover of FIG. 5B, according to one or more embodiments shown and described herein.

FIG. 5A depicts a top plan view of a second style of cover 202, according to various aspects described herein. The second style of cover 202, similar to as described herein, may be defined by a plurality of coupled segments 206. Referring to FIG. 5A, each of the plurality of segments 206, that define a first lateral edge 510 (e.g., in the +x direction of the coordinate axes of FIG. 5A) of the second style of cover 202 may include a protrusion 512 and each of the plurality of segments 206, that define a second lateral edge 520 (e.g., in the −x direction of the coordinate axes of FIG.

5A) of the second style of cover 202 may include a protrusion 522. The protrusion 512 and the protrusion 522 of each segment 206 may be configured to interact with one or more than one cover receiving cavity (e.g., the first cover receiving cavity 214, the second cover receiving cavity 215 and/or the third cover receiving cavity 216 of the housing 204 of FIG. 2B). As described herein, the protrusion 512 of each segment 206 may extend a length “a” from the first lateral edge 510 (e.g., in the +x direction of the coordinate axes of FIG. 5A) and the protrusion 522 of each segment 206 may extend a length “a” from the second lateral edge 520 (e.g., in the −x direction of the coordinate axes of FIG. 5A). The length “a” may correspond to a depth of the one or more than one cover receiving cavity (see FIG. 5C). In some aspects, each protrusion 512 and each protrusion 522 may be a pin. According to some aspects, each protrusion 512 and each protrusion 522 may be located at the joints 208 between adjacent segments. According to other aspects, each protrusion 512 and each protrusion 522 may not be located at the joints 208 between adjacent segments (e.g., located centrally between the joints 208, and/or the like).

FIG. 5B depicts a top plan view of a third style of cover 202, according to various aspects described herein. The third style of cover 202, similar to as described herein, may be defined by a plurality of coupled segments 206. Referring to FIG. 5B, each of the plurality of segments 206 may extend a length “b” (e.g., in the +x direction of the coordinate axes of FIG. 5B) to define a first lateral edge 530 of the third style of cover 202 and each of the plurality of segments 206 may extend a length “b” (e.g., in the −x direction of the coordinate axes of FIG. 5B) to define a second lateral edge 540 of the third style of cover 202. Each segment 206 extension of length “b” may be configured to interact with one or more than one cover receiving cavity (e.g., the first cover receiving cavity 214, the second cover receiving cavity 215 and/or the third cover receiving cavity 216 of the housing 204 of FIG. 2B). As described herein, the length “b” may correspond to a depth of the one or more than one cover receiving cavity (See FIG. 5C).

FIG. 5C depicts a top plan view of the illustrative armrest storage system of FIG. 2A configured for the second style of cover of FIG. 5A and/or the third style of cover of FIG. 5B, according to various aspects described herein. As described in FIG. 2B, the housing 204 may define one or more than one cover receiving cavity (e.g., the first cover receiving cavity 214, the second cover receiving cavity 215 and/or the third cover receiving cavity 216) that may function as a carrier or track for the cover 202. Referring to FIG. 5C, according to various aspects, the one or more than one cover receiving cavity may be defined, in part, by a first flange 550 defined in a first lateral side 552 (e.g., in the +x direction of the coordinate axes of FIG. 5C) of the housing 204 and a second flange 560 defined in a second lateral side 562 (e.g., in the −x direction of the coordinate axes of FIG. 5C) of the housing 204. In view of FIG. 5C, the first flange 550 may be defined a depth “c” within the first lateral side 552 and may not extend (e.g., in the −x direction of the coordinate axes of FIG. 5C) into an opening 525 defined in a top surface (e.g., in the +y direction of the coordinate axes of FIG. 5C) of the housing 204 and the second flange 440 may be defined a depth “c” within the second lateral side 562 and may not extend (e.g., in the +x direction of the coordinate axes of FIG. 5C) into the opening 525 defined in the top surface of the housing 204. The opening 525 may provide access to the storage area 212. Referring briefly to FIG. 2B, at the proximal portion (e.g., in the −z direction of the coordinate axes of FIG. 2B) and at the bottom portion (e.g., in the −y direction of the coordinate axes of FIG. 2B) of the housing 204, the first flange 550 may be defined in the first lateral side 552 and the second flange 560 may be defined in the second lateral side 562 and the first flange 550 and the second flange 560 may extend (e.g., in the −x direction and the +x direction of the coordinate axes of FIG. 5C, respectively) into one another to define a surface to interface with the second and/or third style of cover 202 and to define the storage area 212. According to various aspects, the first flange 550 and the second flange 560 may be configured to, in combination with the second and/or third style of cover 202 (e.g., when installed), bear forces pertinent to a wheelchair armrest. In particular, referring briefly to FIG. 5A, the protrusion 512 of each segment 206 may slidingly interface with the first flange 550 and the protrusion 522 of each segment 206 may slidingly interface with the second flange 560 of the housing 204. Similarly, referring briefly to FIG. 5B, a bottom surface (e.g., in the −y direction of the coordinate axes of FIG. 5B) along the first lateral edge 530 and the second lateral edge 540 of the third style of cover 202 may slidingly interface with the first flange 550 and the second flange 560 of the housing 204. Furthermore, in light of FIG. 2G, the armrest storage system 102A, 102B of FIG. 5C, configured for the second style of cover 202 of FIG. 5A or the third style of cover 202 of FIG. 5B, may permit such covers 202 to be selectively removed and/or installed.

Figure 6A:
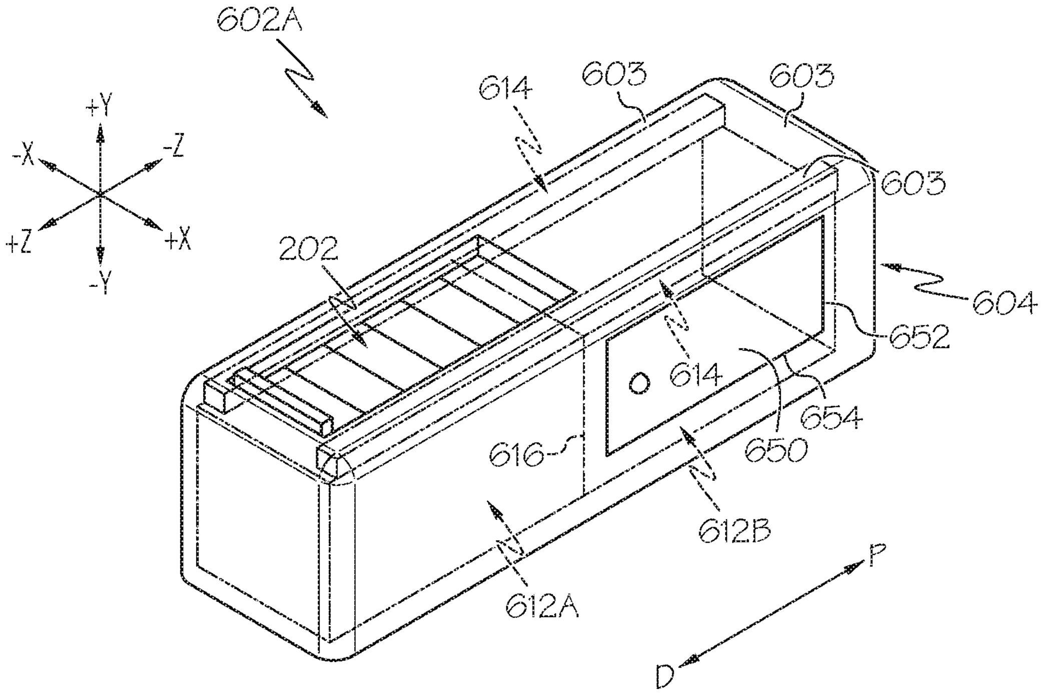
FIG. 6A depicts a perspective view of another illustrative armrest storage system, according to one or more embodiments shown and described herein.

FIG. 6A depicts a perspective view of another illustrative armrest storage system 602A, according to various aspects described herein. Viewing FIG. 6A in light of FIG. 2A, the cover 202 may not extend between a proximal end (e.g., in a “P” direction, in the −z direction of the coordinate axes of FIG. 6A) and a distal end (e.g., in a “D” direction, in the +z direction of the coordinate axes of FIG. 6A) of the housing 604. In particular, a first cover receiving cavity 614 (e.g., depicted in phantom in FIG. 6A) may be defined in a top portion (e.g., in the +y direction of the coordinate axes of FIG. 6A) of the housing 604. The cover 202 may be positioned distally (e.g., in the +z direction of the coordinate axes of FIG. 6A) and configured to retract proximally (e.g., in the −z direction of the coordinate axes of FIG. 6A) into the first cover receiving cavity 614. According to some aspects, similar to as described herein, the cover 202 may be defined by a plurality of coupled segments 206. According to other aspects, the cover 202 may not be defined by a plurality of coupled segments 206 (e.g., a solid piece of material). In such aspects, the cover 202 may be defined by a slidable material or composite configured to stiffen and/or provide structure to the cover 202. This stiffening and/or structure permits the armrest storage system 602A to bear the forces pertinent to a wheelchair armrest. Similar to as described herein, the first cover receiving cavity 614 may function as a carrier or track for the cover 202. A top surface (e.g., in the +y direction of the coordinate axes of FIG. 6A) of the housing 604 may include a pad 603 defined not only on either side (e.g., in the −x and +x direction of the coordinate axes of FIG. 6A) of the cover 202 but also on a proximal portion (e.g., in the −z direction of the coordinate axes of FIG. 6A) of the housing 604 (e.g., above the first cover receiving cavity 614). Viewing FIG. 6A in light of FIG. 2A, such an aspect provides substantially more padding to the wheelchair operator for comfort as well as substantially more housing 604 structure to bear the forces pertinent to a wheelchair armrest.

Still referring to FIG. 6A, one or more than one storage area 612A, 612B may be defined in or by the housing 604. In one aspect, a first storage area 612A (e.g., depicted via phantom lines in FIG. 6A) may be defined in a distal portion (e.g., in the +z direction of the coordinate axes of FIG. 6A) of the housing 604. In such an aspect, for example, the first storage area 612A may be defined beneath (e.g., in the −y direction of the coordinate axes of FIG. 6A) the cover 202 in the closed position. The first storage area 612A, according to various aspects, may be configured to store items likely needing imminent access (e.g., a cell phone, keys, wallet, and/or the like). In another aspect, a second storage area 612B (e.g., depicted via phantom lines in FIG. 6A) may be defined in a proximal portion (e.g., in the −z direction of the coordinate axes of FIG. 6A) of the housing 604. In such an aspect, for example, the second storage area 612B may be defined beneath (e.g., in the −y direction of the coordinate axes of FIG. 6A) the first cover receiving cavity 614. In some aspects, the armrest storage system 602A may include an access door 650 located to access the second storage area 612B. In some aspects, the access door 650 may include a vertical hinge 652 to access the second storage area 612B. In other aspects, the access door 650 may include a horizontal hinge 654 to access the second storage area 612B. The access door 650 may open directly into the second storage area 612B and/or open access to a storage compartment (e.g., similar to a glove box). In light of FIG. 1, the access door 650 of each armrest storage system 602A may be positioned on a seat 106 side (e.g., to avoid interference with a wheel 108, for accessibility to the wheelchair operator, and/or the like). In such aspects, a wheelchair operator may utilize the second storage area 612B for items not likely needing imminent access (e.g., a jacket if it happens to get chilly, a book, and/or the like). In yet further aspects, the first storage area 612A and the second storage area 612B may be defined by the housing 604. In some aspects, the first storage area 612A and the second storage area 612B may be separate storage areas (e.g., separated by a divider 616). In other aspects, the first storage area 612A and the second storage area 612B may be one large storage area (e.g., accessible via the cover 202 when retracted proximally and/or accessible via the access door 650, and/or the like).

Figure 6B:
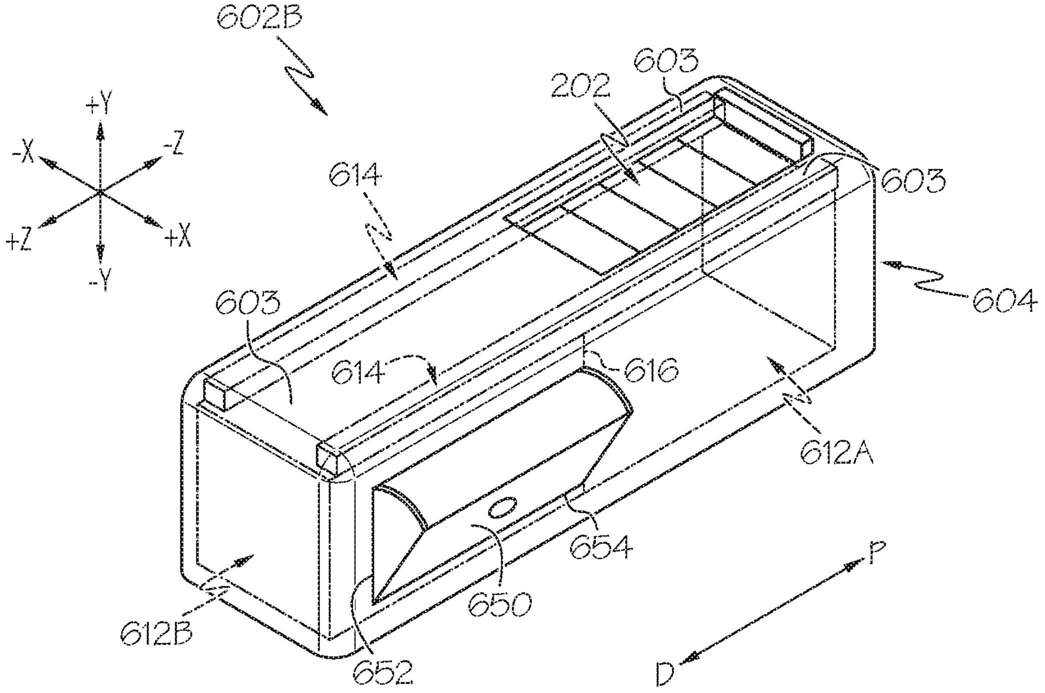
FIG. 6B depicts a perspective view of yet another illustrative armrest storage system, according to one or more embodiments shown and described herein.

FIG. 6B depicts a perspective view of yet another illustrative armrest storage system 602B, according to various aspects described herein. Similar to FIG. 6A, the cover 202 may not extend between a proximal end (e.g., in the "P" direction, in the −z direction of the coordinate axes of FIG. 6B) and a distal end (e.g., in the "D" direction, in the +z direction of the coordinate axes of FIG. 6B) of the housing 604. In particular, a first cover receiving cavity 614 (e.g., depicted in phantom) may be defined in a top portion (e.g., in the +y direction of the coordinate axes of FIG. 6B) of the housing 604. The cover 202 may be positioned proximally (e.g., in the −z direction of the coordinate axes of FIG. 6B) and may be configured to retract distally (e.g., in the +z direction of the coordinate axes of FIG. 6A) into the first cover receiving cavity 614. Similar to as described herein, the first cover receiving cavity 614 may function as a carrier or track for the cover 202. A top surface (e.g., in the +y direction of the coordinate axes of FIG. 6B) of the housing 604 may include a pad 603 defined not only on either side (e.g., in the −x and +x direction of the coordinate axes of FIG. 6B) of the cover 202 but also on a distal portion (e.g., in the +z direction of the coordinate axes of FIG. 6B) of the housing 604. Viewing FIG. 6A in light of FIG. 2A, such an aspect provides substantially more padding to the wheelchair operator for comfort as well as substantially more housing 604 structure to bear the forces pertinent to a wheelchair armrest.

Still referring to FIG. 6B, and similar to FIG. 6A, one or more than one storage area 612A, 612B may be defined by the housing 604. In one aspect, a first storage area 612A (e.g., depicted via phantom lines in FIG. 6B) may be defined in a proximal portion (e.g., in the −z direction of the coordinate axes of FIG. 6B) of the housing 604. In such an aspect, for example, the first storage area 612A may be defined beneath (e.g., in the −y direction of the coordinate axes of FIG. 6B) the cover 202 in the closed position. In another aspect, a second storage area 612B (e.g., depicted via phantom lines in FIG. 6B) may be defined in a distal portion (e.g., in the +z direction of the coordinate axes of FIG. 6B) of the housing 604. In such an aspect, for example, the second storage area 612B may be defined beneath (e.g., in the −y direction of the coordinate axes of FIG. 6B) the first cover receiving cavity 614. In some aspects, the armrest storage system 602B may include an access door 650 located to access the second storage area 612B. In some aspects, the access door 650 may include a vertical hinge 652 to access the second storage area. In other aspects, the access door 650 may include a horizontal hinge 654 to access the second storage area 612B. The access door 650 may open directly into the second storage area 612B and/or open access to a storage compartment (e.g., similar to a glove box). In light of FIG. 1, the access door 650 of each armrest storage system 602A may be positioned on a seat 106 side (e.g., to avoid interference with a wheel 108, for accessibility to the wheelchair operator, and/or the like). In yet further aspects, the first storage area 612A and the second storage area 612B may be defined by the housing 604. In some aspects, the first storage area 612A and the second storage area 612B may be separate storage areas (e.g., separated by a divider 616). In other aspects, the first storage area 612A and the second storage area 612B may be one large storage area (e.g., accessible via the cover 202 when retracted distally and/or accessible via the access door 650, and/or the like). In various aspects, the cover 202 may be positioned proximal of the wheelchair operator's elbow (e.g., for wheelchair operator comfort).

Figure 7A:
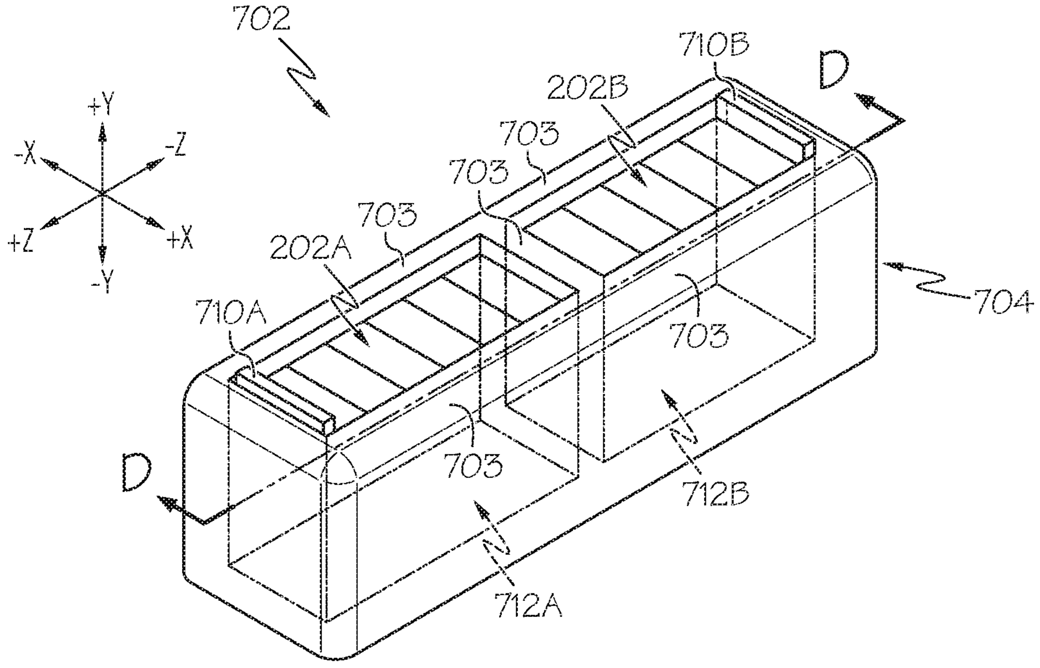
FIG. 7A depicts a perspective view of an illustrative armrest storage system that includes more than one cover, according to one or more embodiments shown and described herein.

FIG. 7A depicts a perspective view of an illustrative armrest storage system 702 that includes more than one cover 202A, 202B, according to various aspects described herein. Referring to FIG. 7A, a first cover 202A may be configured to retract, via actuator 710A, in a first direction (e.g., in a −z direction of the coordinate axes of FIG. 7A) and a second cover 202B may be configured to retract, via actuator 710B, in a second direction (e.g., in the +z direction of the coordinate axes of FIG. 7A).

In view of FIG. 7A, such an orientation of the first cover 202A and the second cover 202B may maximize an available top surface (e.g., in the +y direction of the coordinate axes of FIG. 7A) of the housing 704 for wheelchair operator use. The top surface of the housing 704 may include a pad 703 defined on either side of and/or between the covers 202A, 202B as depicted in FIG. 7A for wheelchair operator comfort. Furthermore, such an orientation of the first cover 202A and the second cover 202B may enable easier reachability and/or accessibility by a wheelchair operator. For example, a wheelchair operator may have limited arm strength and/or movement in one or more of their arms. The first cover 202A, positioned at the wheelchair operator's hand, may provide convenient access to the storage area 712A. The second cover 202B may provide convenient access, via the wheelchair operator's other hand (e.g., across their body), to the storage area 712B. In another aspect (not shown), the first cover 202A may be configured to retract from a central portion of the housing 704 toward the second direction of the housing 704 (e.g., in the +z direction of the coordinate axes of FIG. 7A) and the second cover 202B may be configured to retract from the central portion of the housing 704 toward the first direction of the housing 704 (e.g., in the −z direction of the coordinate axes of FIG. 7A).

Still referring to FIG. 7A, a first storage area 712A (e.g., depicted via phantom lines in FIG. 7A) may be may be defined beneath (e.g., in the −y direction of the coordinate axes of FIG. 7A) the first cover 202A in the closed position and a second storage area 712B (e.g., depicted via phantom lines in FIG. 7A) may be may be defined beneath (e.g., in the −y direction of the coordinate axes of FIG. 7A) the second cover 202B in the closed position.

Figure 7B:
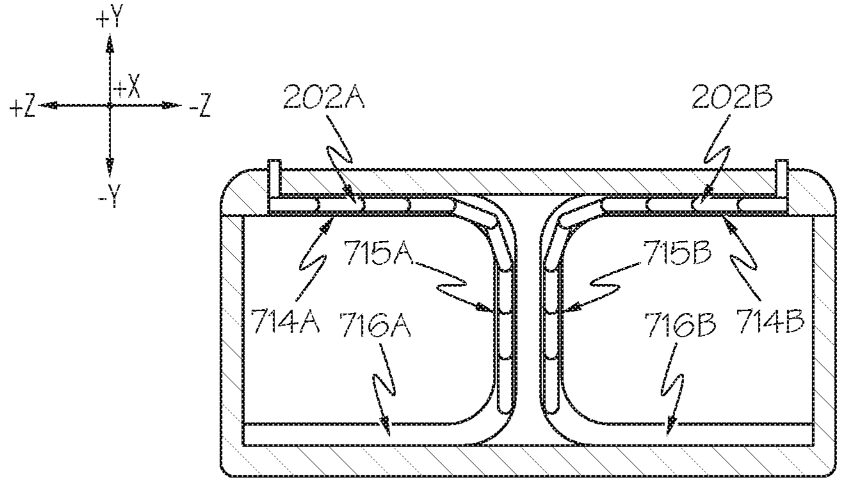
FIG. 7B depicts the cross-sectional view, along axis D-D, of the illustrative armrest storage system of FIG. 7A, where the covers are in a fully closed position, according to one or more embodiments shown and described herein.

FIG. 7B depicts the cross-sectional view, along axis D-D, of the illustrative armrest storage system of FIG. 7A, where the covers 202A, 202B are in a fully closed position, according to various aspects described herein. In view of FIG. 7B, the first cover 202A may be configured to translate through a first cover receiving cavity 714A, a second cover receiving cavity 715A, and a third cover receiving cavity 716A defined in the housing 704 (e.g., which function as a carrier or track for the first cover 202A) and the second cover 202B may be configured to translate through a first cover receiving cavity 714B, a second cover receiving cavity 715B, and a third cover receiving cavity 716B defined in the housing 704 (e.g., which function as a carrier or track for the second cover 202B).

Figure 8B:
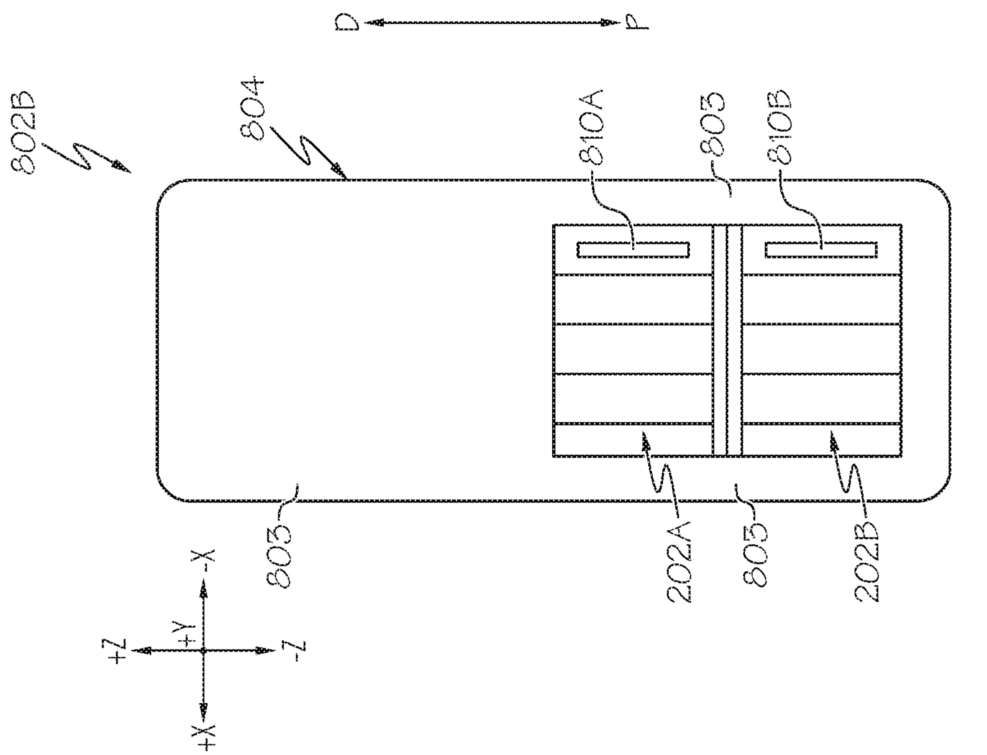
FIG. 8B depicts a plan view of yet another illustrative armrest storage system that includes more than one cover, according to one or more embodiments shown and described herein.
Figure 8A:
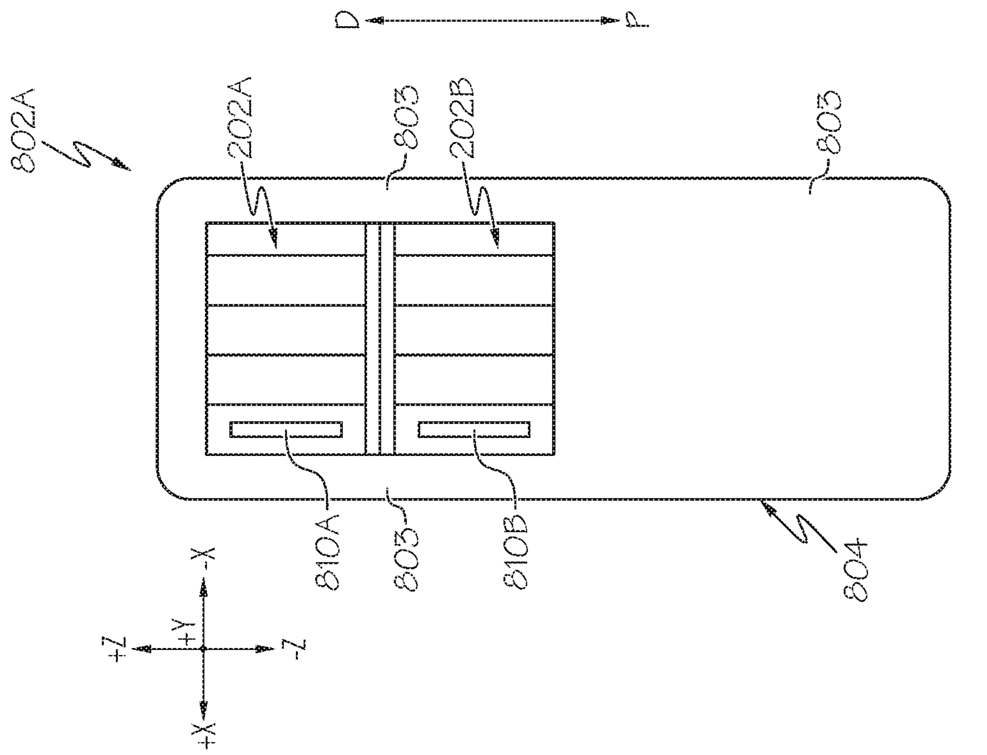
FIG. 8A depicts a plan view of another illustrative armrest storage system that includes more than one cover, according to one or more embodiments shown and described herein.

FIG. 8A depicts a plan view of another illustrative armrest storage system 802A that includes more than one cover 202A, 202B, according to various aspects described herein. Referring to FIG. 8A, a first cover 202A may be positioned distally (e.g., in a “D” direction, in the +z direction of the coordinate axes of FIG. 8A) and may be configured to retract, via actuator 810A, in a first transverse direction (e.g., in a −x direction of the coordinate axes of FIG. 8A). A second cover 202B may also be positioned distally (e.g., in the “D” direction, in the +z direction of the coordinate axes of FIG. 8A), adjacent to the first cover 202A, and may also be configured to retract, via actuator 810B, in the first transverse direction (e.g., in the −x direction of the coordinate axes of FIG. 8A). In other aspects (not shown), the first cover 202A and the second cover 202B may be configured to retract, via actuator 810A and 810B respectively, in a second transverse direction (e.g., in a +x direction of the coordinate axes of FIG. 8A). In yet further aspects (not shown), the first cover 202A and the second cover 202B may be configured to retract, via actuator 810A and 810B respectively, in opposite transverse directions (e.g., the first cover 202A in a +x direction and the second cover in a −x direction of the coordinate axes of FIG. 8A, or vice versa). In view of FIG. 8A, such an orientation of the first cover 202A and the second cover 202B may maximize an available top surface (e.g., in the +y direction of the coordinate axes of FIG. 8A) of the housing 804 for wheelchair operator use. The top surface of the housing 804 may include a pad 803 that surrounds the covers 202A, 202B as depicted in FIG. 8A for wheelchair operator comfort. Furthermore, such an orientation of the first cover 202A and the second cover 202B may enable easier reachability and/or accessibility by a wheelchair operator. For example, a wheelchair operator may have limited arm strength and/or movement. The first cover 202A and the second cover 202B, positioned at or near the wheelchair operator’s hand, may provide convenient access to respective storage areas, similar to as described herein, defined beneath (e.g., in the −y direction of the coordinate axes of FIG. 8A) the first cover 202A and the second cover 202B, respectively.

FIG. 8B depicts a plan view of another illustrative armrest storage system 802B that includes more than one cover 202A, 202B, according to various aspects described herein. Referring to FIG. 8B, a first cover 202A may be positioned proximally (e.g., in a “P” direction, in the −z direction of the coordinate axes of FIG. 8B) and may be configured to retract, via actuator 810A, in a second transverse direction (e.g., in a +x direction of the coordinate axes of FIG. 8B). A second cover 202B may also be positioned proximally (e.g., in the “P” direction, in the −z direction of the coordinate axes of FIG. 8B), adjacent to the first cover 202A, and may also be configured to retract, via actuator 810B, in the second transverse direction (e.g., in the +x direction of the coordinate axes of FIG. 8A). In other aspects (not shown), the first cover 202A and the second cover 202B may be configured to retract, via actuator 810A and 810B respectively, in a first transverse direction (e.g., in a −x direction of the coordinate axes of FIG. 8B). In yet further aspects (not shown), the first cover 202A and the second cover 202B may be configured to retract, via actuator 810A and 810B respectively, in opposite transverse directions (e.g., the first cover 202A in a +x direction and the second cover in a −x direction of the coordinate axes of FIG. 8B, or vice versa). In view of FIG. 8B, such an orientation of the first cover 202A and the second cover 202B may maximize an available top surface (e.g., in the +y direction of the coordinate axes of FIG. 8B) of the housing 804 for wheelchair operator use. The top surface of the housing 804 may include a pad 803 that surrounds the covers 202A, 202B as depicted in FIG. 8B for wheelchair operator comfort. Furthermore, such an orientation of the first cover 202A and the second cover 202B may enable easier reachability and/or accessibility by a wheelchair operator. For example, the first cover 202A and the second cover 202B, positioned at or near the wheelchair operator’s elbow, may provide convenient access, via the wheelchair operator’s other hand (e.g., across their body), to respective storage areas, similar to as described herein, defined beneath (e.g., in the −y direction of the coordinate axes of FIG. 8B) the first cover 202A and the second cover 202B, respectively. Positioning each of the actuators 810A, 810B, as depicted in FIG. 8B, may provide additional wheelchair operator comfort (e.g., avoids interference with the wheelchair operator’s elbow). In some aspects, the first cover 202A and the second cover 202B may be positioned proximal of the wheelchair operator’s elbow (e.g., for wheelchair operator comfort).

Figure 9A:
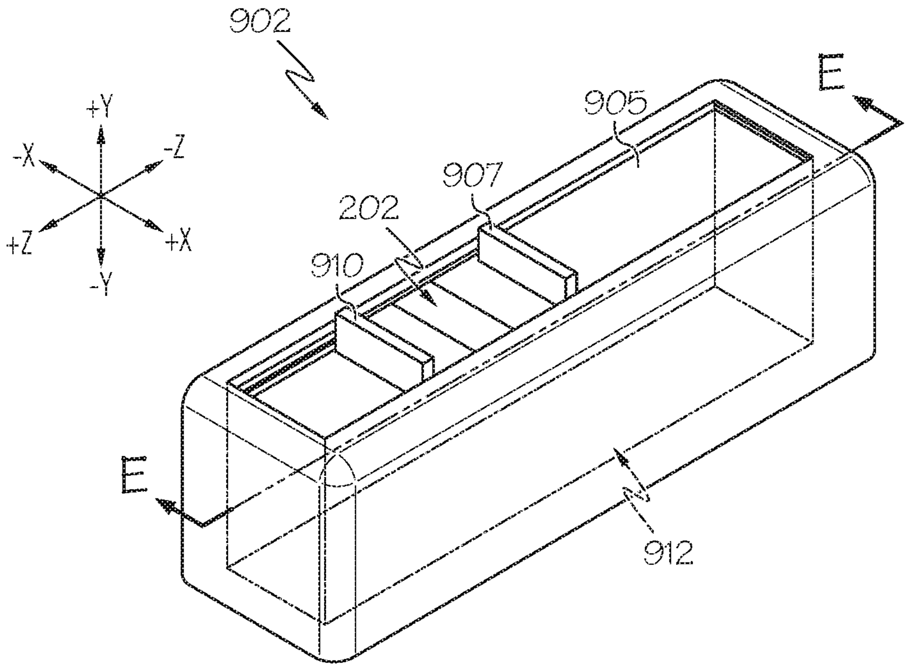
FIG. 9A depicts a perspective view of yet another illustrative armrest storage system that includes a cover and a cover pad, according to one or more embodiments shown and described herein.

FIG. 9A depicts a perspective view of yet another illustrative armrest storage system 902, according to various aspects described herein. Referring to FIG. 9A, the armrest storage system 902 may include not only a cover 202, as described herein, but also a cover pad 905. As illustrated in FIG. 9A, both the cover 202 and the cover pad 905 may translate distally (e.g., in the +z direction of the coordinate axes of FIG. 9A) and proximally (e.g., in the −z direction of the coordinate axes of FIG. 9A). In such aspects, an actuator 910 may be configured to translate the cover 202 and an actuator 907 may be configured to translate the cover pad 905. More specifically, with the actuator 907 in a proximal position (e.g., in the −z direction of the coordinate axes of FIG. 9A), the actuator 910 may be translated proximally to open access to and/or reveal the storage area 912 (e.g., depicted via phantom lines in FIG. 9A) and distally to close access to and/or conceal the storage area 912. With the actuator 910 in a distal position (e.g., in the +z direction of the coordinate axes of FIG. 9A), the actuator 907 may be translated proximally to reveal the cover 202 and to store the cover pad 905 and distally to conceal the cover 202 and to provide the cover pad 905 for the wheelchair operator’s comfort. According to various aspects, the cover 202 and the cover pad 905 may be translated individually (e.g., as described) and/or together. More specifically, with the actuator 910 and the actuator 907 in a distal position (e.g., in the +z direction of the coordinate axes of FIG. 9A), the actuator 910 may be translated proximally such that it interferes with the actuator 907 to translate the cover pad 905 proximally as well as to open access to and/or reveal the storage area 912. Similarly, with the actuator 910 and the actuator 907 in a proximal position (e.g., in the −z direction of the coordinate axes of FIG. 9A), the actuator 907 may be translated distally such that it interferes with the actuator 910 to translate the cover 202 distally to close access to and/or conceal the storage area 912 as well as to provide the cover pad 905 for the wheelchair operator's comfort.

Figure 9B:
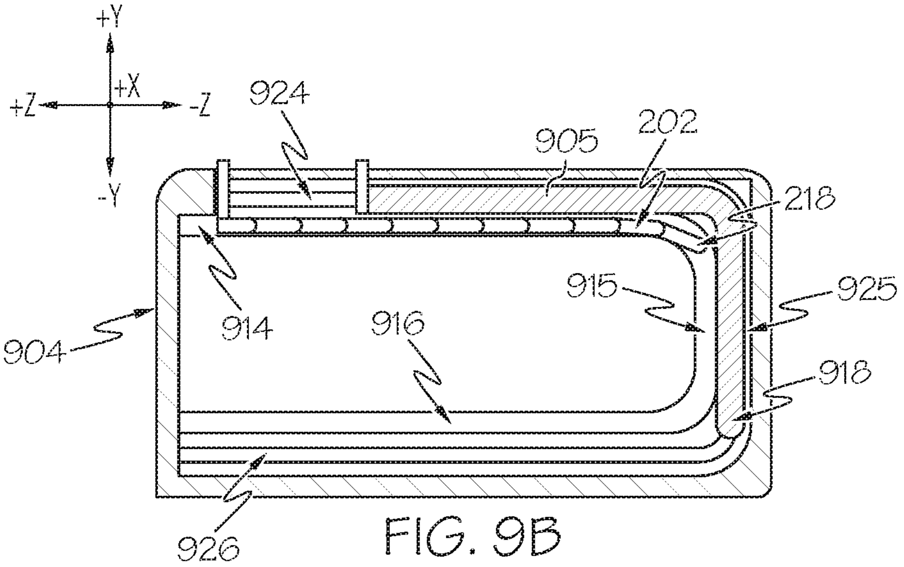
FIG. 9B depicts the cross-sectional view, along axis E-E, of the illustrative armrest storage system of FIG. 9A, where the cover is in a fully closed position and the cover pad is in a partially closed position, according to one or more embodiments shown and described herein.

FIG. 9B depicts the cross-sectional view, along axis E-E, of the illustrative armrest storage system of FIG. 9A, where the cover 202 is in a fully closed position and the cover pad 905 is in a partially closed position, according to various aspects described herein. In view of FIG. 9B, a first cover receiving cavity 914 may be defined in a top portion (e.g., in the +y direction of the coordinate axes of FIG. 9B) of the housing 904, a second cover receiving cavity 915 may be defined in a proximal portion (e.g., in the −z direction of the coordinate axes of FIG. 9B) of the housing 904 and a third cover receiving cavity 916 may be defined in a bottom portion (e.g., in the −y direction of the coordinate axes of FIG. 9B) of the housing 904. Viewing FIG. 9B in light of FIG. 9A, when the cover 202 is translated proximally (i.e., in the −z direction of the coordinate axes of FIG. 9B) a second end 218 of the cover 202 translates from the first cover receiving cavity 914, through the communicatively coupled second cover receiving cavity 915, and into the communicatively coupled third cover receiving cavity 916. Similarly, a first cover pad receiving cavity 924 may be defined in a top portion (e.g., in the +y direction of the coordinate axes of FIG. 9B) of the housing 904, a second cover pad receiving cavity 925 may be defined in a proximal portion (e.g., in the −z direction of the coordinate axes of FIG. 9B) of the housing 904 and a third cover pad receiving cavity 926 may be defined in a bottom portion (e.g., in the −y direction of the coordinate axes of FIG. 9B) of the housing 904. Viewing FIG. 9B in light of FIG. 9A, when the cover pad 905 is translated proximally (i.e., in the −z direction of the coordinate axes of FIG. 9B) an end 918 of the cover pad 905 translates from the first cover pad receiving cavity 924, through the communicatively coupled second cover pad receiving cavity 925, and into the communicatively coupled third cover pad receiving cavity 926. Here it should be understood that other aspects, as described herein (e.g., the armrest storage system of FIG. 6A, the armrest storage system of FIG. 12A to cover the display, or the like), may include such a cover pad 905 in a similar manner to as described herein. Furthermore, according to other aspects, it should be understood that each of the plurality of segments 206 of the covers 202 described herein may include a pad for the wheelchair operator's comfort.

According to aspects of the present disclosure, the cover 202 of the various armrest storage systems, as described herein, may be manually operated (e.g., via hand by the wheelchair operator). However, as described herein, a wheelchair operator may have limited arm mobility and/or arm strength. Accordingly, various aspects of the present disclosure include assisted operation and/or automated operation of the cover 202.

Figure 10A:
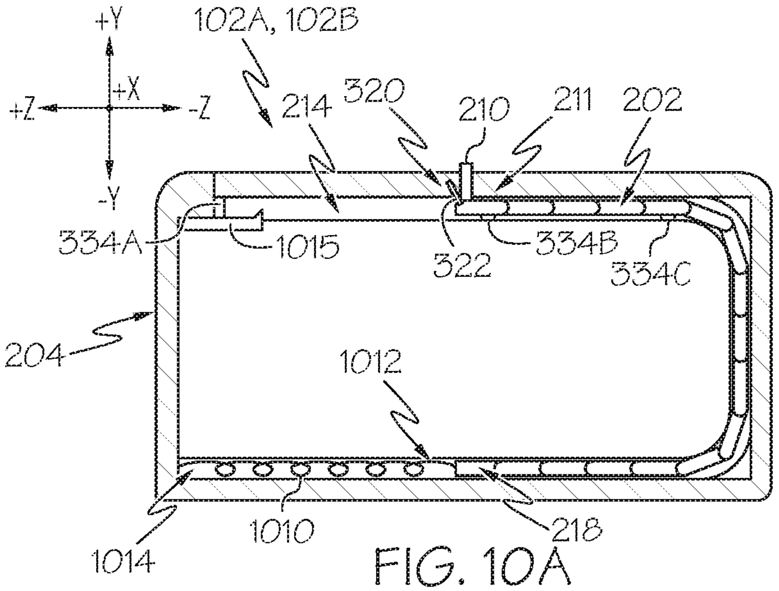
FIG. 10A depicts a cross-sectional view, along axis A-A, of the illustrative armrest storage system of FIG. 2A, where operation of the cover may be assisted via a mechanical device, according to one or more embodiments shown and described herein.

FIG. 10A depicts a cross-sectional view, along axis A-A, of the illustrative armrest storage system 102A, 102B of FIG. 2A, where operation of the cover 202 may be assisted via a mechanical device 1010, according to various aspects of the present disclosure. Referring to FIG. 10A, a mechanical device 1010 may be coupled to the cover 202 to assist operation of the cover. In one aspect, for example, the mechanical device 1010 may include a spring. In view of FIG. 10A, a first end 1012 of the mechanical device 1010 may be coupled to a second end 218 of the cover 202 and a second end 1014 of the mechanical device 1010 may be coupled to the housing 204. In light of FIG. 10A, when the cover 202 is manually translated, via actuator 210, proximally (e.g., in the −z direction of the coordinate axes of FIG. 10A) the second end 218 of the cover 202 may compress the mechanical device 1010 (e.g., spring) thereby storing potential energy within the mechanical device 1010. In such an aspect, the cover 202 may include a lock mechanism 320 (e.g., FIG. 3B) having a lock actuator 322 and one or more than one lock pin cavity 334A, 334B, 334C defined in the housing 204 along the first cover receiving cavity 214. In such aspects, the lock mechanism 320 may retain the cover in position (e.g., at lock pin cavity 334B, lock pin cavity 334C, and/or the like) against a restoring force that results from potential energy stored within the mechanical device 1010. Further in such aspects, after the cover 202 is released, via the lock mechanism 320, the potential energy is converted to kinetic energy to return (e.g., in the +z direction of the coordinate axes of FIG. 10A) a first end 211 of the cover 202 to its closed position. In some aspects, a damper 1015 may be located near a distal end (e.g., in the +z direction of the coordinate axes of FIG. 10A) of the first cover receiving cavity 214 and positioned to interface with the first end 211 of the cover 202 such that the cover 202 closes slowly (e.g., to avoid injury to a wheelchair operator who may lack arm strength and/or mobility).

Figure 10B:
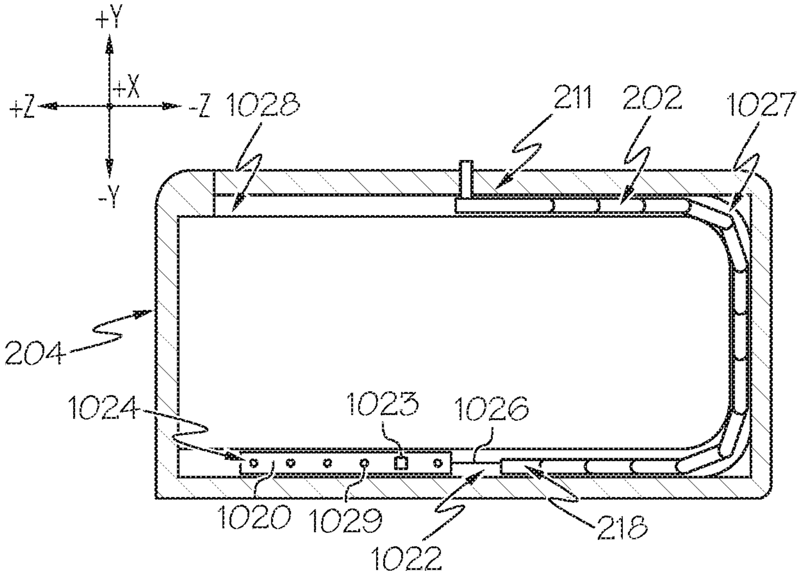
FIG. 10B depicts a cross-sectional view, along axis A-A, of the illustrative armrest storage system of FIG. 2A, where operation of the cover may be automated via a cylinder and rod device, according to one or more embodiments shown and described herein.

FIG. 10B depicts a cross-sectional view, along axis A-A, of the illustrative armrest storage system of FIG. 2A, where operation of the cover 202 may be automated via a cylinder and rod device 1020, according to various aspects of the present disclosure. Referring to FIG. 10B, a cylinder and rod device 1020 may be coupled to the cover 202 to automate operation of the cover 202. In one aspect, for example, the cylinder and rod device 1020 may include an electrical linear actuator. In other aspects, the cylinder and rod device 1020 may include a pneumatic actuator, a hydraulic actuator, and/or the like. In view of FIG. 10B, a first end 1022 of the cylinder and rod device 1020 (e.g., the rod) may be coupled to a second end 218 of the cover 202 and a second end 1024 of the cylinder and rod device 1020 (e.g., the cylinder) may be coupled to the housing 204. In light of FIG. 10A, a rod 1026 of the cylinder and rod device 1020 may be configured to translate the second end 218 of the cover 202 proximally (e.g., in the −z direction of the coordinate axes of FIG. 10B) to translate a first end 211 of the cover 202 distally (e.g., in the +z direction of the coordinate axes of FIG. 10B) to one or more than one position between a fully open cover position 1027 and a fully closed cover position 1028. Similarly, the rod 1026 of the cylinder and rod device 1020 may be configured to translate the second end 218 of the cover 202 distally (e.g., in the +z direction of the coordinate axes of FIG. 10B) to translate the first end 211 of the cover 202 proximally (e.g., in the +z direction of the coordinate axes of FIG. 10B) to one or more than one position between the fully closed cover position 1028 and the fully open cover position 1027. According to various aspects, the cylinder and rod device 1020 may include a one or more than one position sensor 1029 (e.g., feedback sensor) to detect a current position of the rod 1026. In some aspects, translation of the cover 202 may be selectively controlled by a wheelchair operator via a control input interface (e.g., physical control buttons, a graphical user interface including control buttons, or the like, to fully open the cover 202 from any position, to fully close the cover 202 from any position, to translate or step the first end 211 of the cover 202 proximally toward the fully open cover position 1027, to translate or step the first end 211 of the cover 202 distally toward the fully closed cover positon 1028, and/or the like). In some aspects, the cylinder and rod device 1020 may include a pressure sensor 1023 to detect an obstruction during translation (e.g., proximally and/or distally) of the cover 202 (e.g., to avoid pinching a wheelchair operator who may lack arm strength and/or mobility, to avoid binding of the cover 202, and/or the like). A control system (not shown) associated with the wheelchair 100 (e.g., FIG. 1) may be configured to override a wheelchair operator control input (e.g., if an obstruction is detected via the pressure sensor 1023) to stop and/or reverse translation of the cover 202.

Figure 10C:
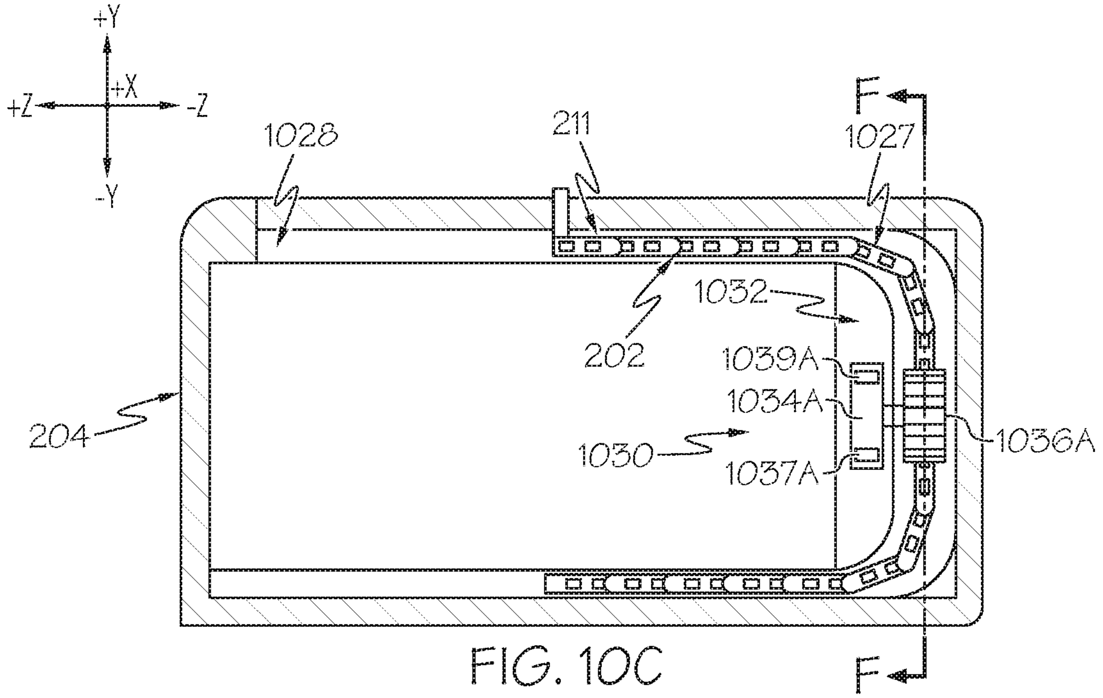
FIG. 10C depicts a cross-sectional view, along axis A-A, of the illustrative armrest storage system of FIG. 2A, where operation of the cover may be automated via a motorized device, according to one or more embodiments shown and described herein.

FIG. 10C depicts a cross-sectional view, along axis A-A, of the illustrative armrest storage system of FIG. 2A, where operation of the cover 202 may be automated via a motorized device 1030, according to various aspects of the present disclosure. Referring to FIG. 10C, the motorized device 1030 may be coupled to the cover 202 to automate operation of the cover 202. According to various aspects, in view of FIG. 10C, the housing 204 may further define a motor housing 1032. In such aspects, one or more than one motor (e.g., 1034A) may be configured to drive one or more than one gear (e.g., 1036A) where the one or more than one gear (e.g., 1036A) is coupled to the cover 202.

Figure 10D:
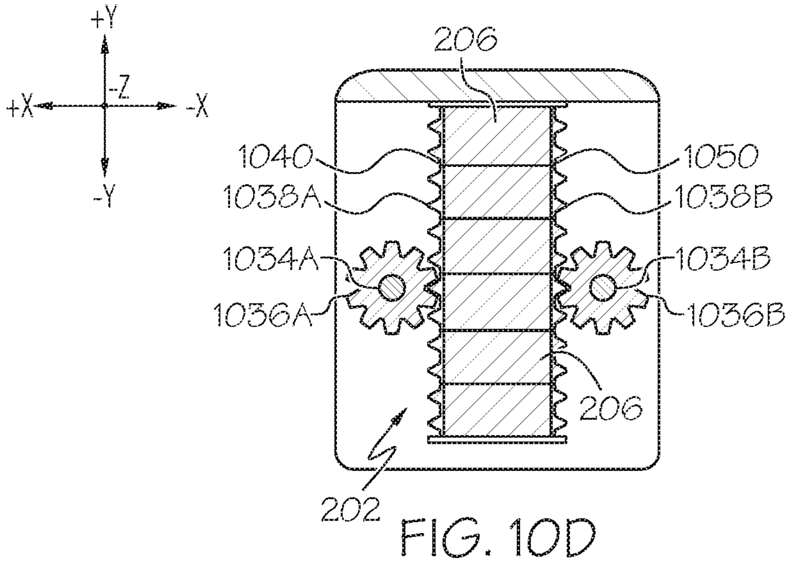
FIG. 10D depicts a cross-sectional view, along axis F-F, of the illustrative armrest storage system of FIG. 10C, according to one or more embodiments shown and described herein.

FIG. 10D depicts a cross-sectional view, along axis F-F, of the illustrative armrest storage system of FIG. 10C, according to various aspects of the present disclosure. Referring to FIG. 10D, in such aspects, a first lateral edge 1040 of each segment of the plurality of segments 206 may include a gear rack 1038A configured to interface with a gear 1036A and a second lateral edge 1050 of each segment of the plurality of segments 206 may include a gear rack 1038B configured to interface with a gear 1036B. In other aspects, the first lateral edge 1040 and the second lateral edge 1050 of each segment may include openings (not shown) configured to interface with the gear 1036A and the gear 1036B respectively. Viewing FIG. 10C in light of FIG. 10D, counter-clockwise rotation of the gear 1036A, via motor 1034A, and clockwise rotation of the gear 1036B, via motor 1034B, may translate a first end 211 of the cover 202 distally (e.g., in the +z direction of the coordinate axes of FIG. 10C) to any position between a fully open cover position 1027 and a fully closed cover position 1028. Similarly, clockwise rotation of the gear 1036A, via motor 1034A, and counter-clockwise rotation of the gear 1036B, via motor 1034B, may translate the first end 211 of the cover 202 proximally (e.g., in the −z direction of the coordinate axes of FIG. 10C) to any position between the fully closed cover position 1028 and the fully open cover position 1027. According to various aspects, each of the motors 1034A, 1034B may be a stepper motor to control and/or step the position of the cover 202 between the fully open cover position 1027 and the fully closed cover position 1028. According to other aspects, each of the motors 1034A, 1034B may include a rotation sensor (e.g., rotation sensor 1037A of FIG. 10C) to control the position of the cover 202. Similar to as described herein, translation of the cover 202 may be selectively controlled by a wheelchair operator via a control input interface (e.g., physical control buttons, a graphical user interface including control buttons, or the like, to fully open the cover 202 from any position, to fully close the cover 202 from any position, to translate the first end 211 of the cover 202 proximally toward the fully open cover position 1027, to translate the first end 211 of the cover 202 distally toward the fully closed cover positon 1028, and/or the like). In some aspects, each of the motors 1034A, 1034B may include a pressure sensor (e.g., pressure sensor 1039A of FIG. 10C) to detect an obstruction during translation of the cover 202 (e.g., to avoid pinching a wheelchair operator who may lack arm strength and/or mobility, to avoid binding the cover 202, and/or the like). A control system (not shown) associated with the wheelchair 100 (e.g., FIG. 1) may be configured to override a wheelchair operator control input (e.g., if an obstruction is detected via the pressure sensor 1039A) to stop and/or reverse translation of the cover 202. Here, it should be understood that, according to alternative aspects, the cover 202 may be translated via other assisted and/or automated mechanisms (e.g., a pulley system, a cable system similar to window blinds, and/or the like).

Figure 11B:
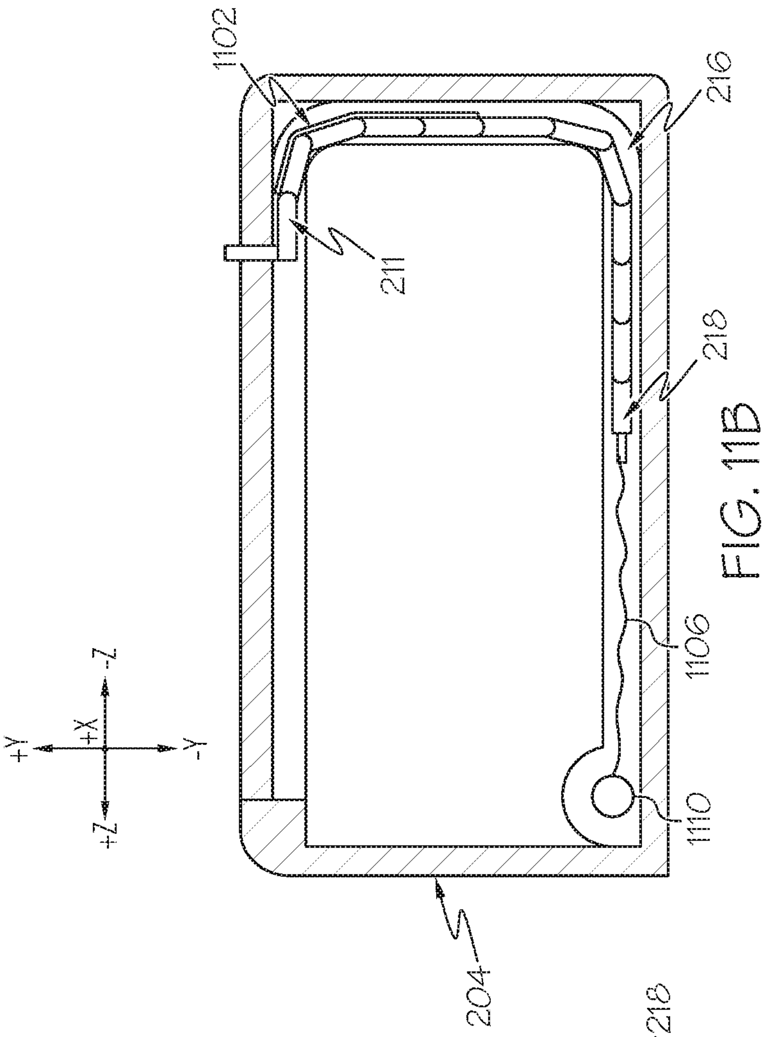
FIG. 11B depicts a cross-sectional view, along axis A-A, of the illustrative armrest storage system of FIG. 2A, where the housing includes a cable control device, according to one or more embodiments shown and described herein.
Figure 11A:
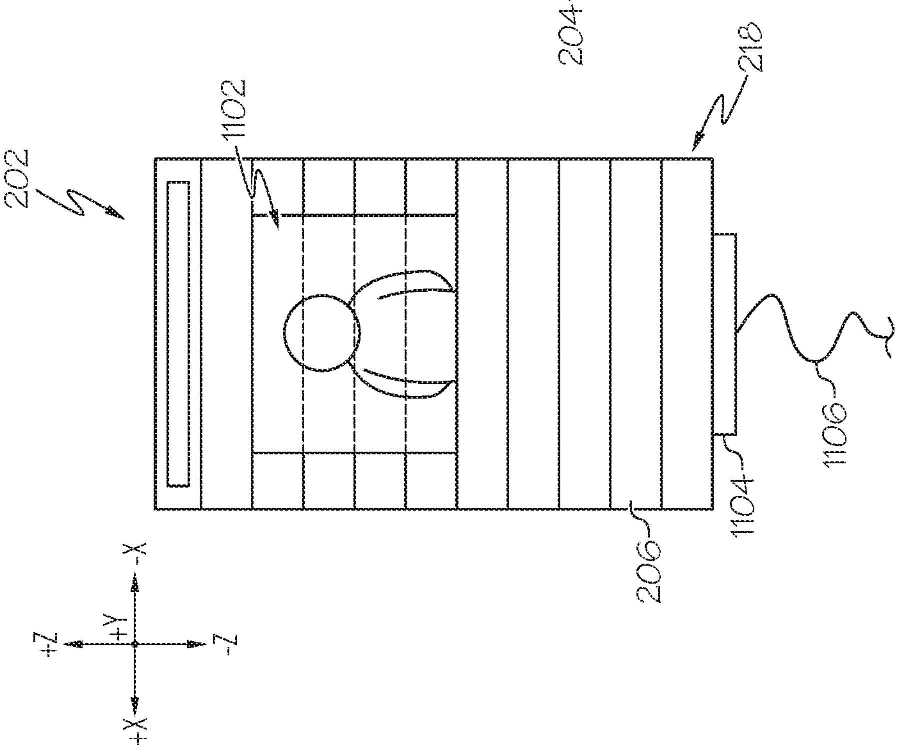
FIG. 11A depicts a top plan view of an illustrative cover that includes a display, according to one or more embodiments shown and described herein.

FIG. 11A depicts a top plan view of an illustrative cover 202 that includes a display 1102, according to various aspects described herein. The cover 202, as described herein, may be defined by a plurality of coupled segments 206. Referring to FIG. 11A, one or more than one segment of the plurality of segments 206 may define the user-facing display 1102. Here, although FIG. 11A depicts one display 1102, it should be understood that the cover 202 may include a plurality of separate displays. In some aspects, the display 1102 may be a flexible display (e.g., an organic light-emitting diode (OLED) display, an electronic paper display, an organic liquid crystal display (OLCD), and/or the like). In other aspects, the display 1102 may be a static display. In view of FIG. 11A, a second end 218 of the cover 202 may include a wired connector 1104 having a wire 1106 to power and/or transmit images and/or information to the display 1102. According to various aspects, the wired connector 1104 may be electrically coupled, via the wire 1106, to a control system (not shown) of the wheelchair 100 (e.g., FIG. 1) to display one or more than one image and/or information on the display 1102 (e.g., wheelchair status information, information associated with a cell phone such as texts, calls, or the like received via a Bluetooth® connection, information associated with smart home such door lock/unlock, light on/off, or the like received via a wireless connection, information associated with the armrest storage system such as whether the storage system is locked, items or contents within the storage system such a keys, a cell phone, or the like, auxiliary information, and/or the like). According to another aspect, the cover 202 may not include the wired connector 1104 and/or wire 1106. In such aspects, the display 1102 may include and/or be coupled to a local power source (e.g., battery) and a transceiver to wirelessly communicate images and/or information with the control system (not shown) of the wheelchair 100 (e.g., FIG. 1). According to various aspects, the one or more than one image may include a graphical user interface for the wheelchair operator to control one or more than one feature and/or functionality of the wheelchair 100 (e.g., maneuverability controls). In such aspects, the display 1102 provides a relatively larger user interface for the wheelchair operator to jump to a desired user interface or menu and/or to switch between modes of operation without having to flip through a number of relatively smaller user interfaces to realize a desired feature and/or functionality of the wheelchair. According to other aspects, the one or more than one image may include an image of a dynamic bubble level for the wheelchair operator to access an orientation of (e.g., levelness, to level) the wheelchair 100. In other aspects, the one or more than one image may include an image of a pressure distribution on and/or a heat map of the seat 106 bottom and/or back (FIG. 1) and/or a period of time that the wheelchair operator has been in a certain position to prompt position adjustment, a battery life indicator, a range indicator, or the like via a linear scale interface element, and/or the like. Here, it should be understood that other desired images and/or information, static and/or dynamic, may be displayed via the display 1102.

FIG. 11B depicts a cross-sectional view, along axis A-A, of the illustrative armrest storage system of FIG. 2A, where the housing 204 includes a wire control device 1110, according to various aspects described herein. Referring to FIG. 11B, the wire control device 1110 may be positioned in a distal portion (e.g., in the +z direction of the coordinate axes of FIG. 11B) of the third cover receiving cavity 216 defined in the bottom portion (e.g., in the −y direction of the coordinate axes of FIG. 11B) of the housing 204. In light of FIG. 11B, as a first end 211 of the cover 202 is translated (e.g., via manual, assisted, and/or automated operation) proximally (e.g., in a −z direction of the coordinate axes of FIG. 11B) and the second end 218 of the cover 202 is translated distally (e.g., in the +z direction of the coordinate axes of FIG. 11B) the wire control device 1110 may be configured to rotatingly retract any slack in the wire 1106 (e.g., to avoid wire 1106 tangle). Similarly, as the first end 211 of the cover 202 is translated (e.g., via manual, assisted, and/or automated operation) distally (e.g., in a +z direction of the coordinate axes of FIG. 11B) and the second end 218 of the cover 202 is translated proximally (e.g., in the −z direction of the coordinate axes of FIG. 11B) the wire control device 1110 may be configured to rotatingly release the wire 1106 such that slack in the wire 1106 is minimized. Furthermore, in view of FIG. 11B, the one or more than one segment of the plurality of segments 206 that define the user-facing display 1102 may be configured to flex as the cover 202 is translated distally and/or proximally.

Figure 12A:
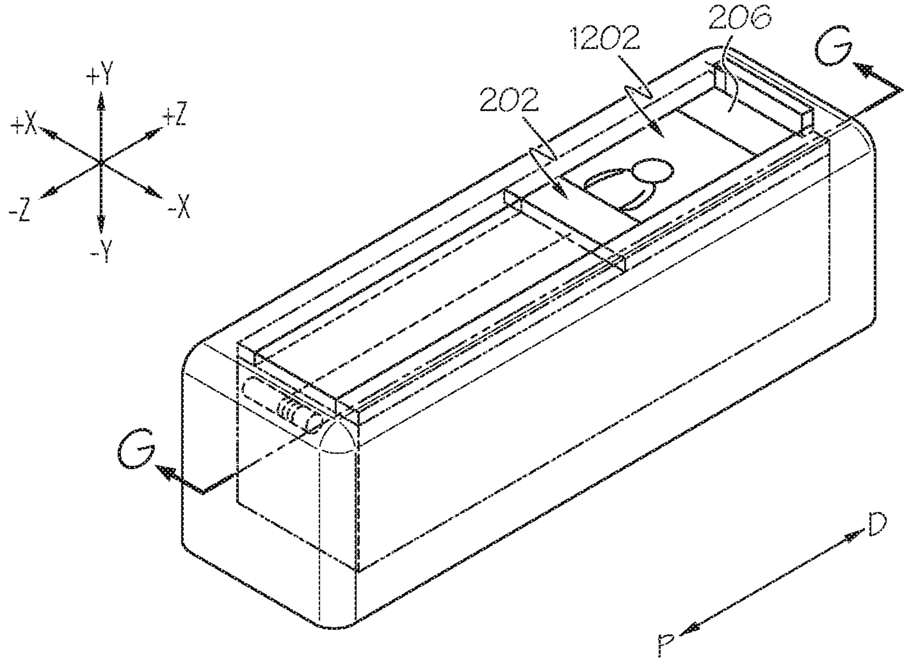
FIG. 12A depicts a perspective view of the illustrative armrest storage system of FIG. 6A, including a user-facing display, according to one or more embodiments shown and described herein.

FIG. 12A depicts a perspective view of the illustrative armrest storage system of FIG. 6A, including a user-facing display 1202, according to various aspects described herein. According to some aspects, the cover 202 may be defined by a plurality of coupled segments 206 and one or more than one segment of the plurality of segments 206 may define the display 1202. In some aspects, the display 1202 may be the user-facing display 1102 of FIG. 11A (e.g., a flexible display). In other aspects, the display 1202 may not be specifically configured for flexibility (e.g., a flat screen display, LCD, LED, and/or the like). Here, it should be understood that other displays (e.g., a thin-film-transistor liquid-crystal display (TFT LCD) or the like) may be used. According to other aspects, the cover 202 may not be defined by a plurality of coupled segments 206. In such aspects, the cover 202 may be defined by a material or composite configured to stiffen and/or provide structure to the cover 202 to bear the forces pertinent to a wheelchair armrest. Further in such aspects, the display 1202 may be defined on an upper surface (e.g., in the +y direction of the coordinate axes of FIG. 12A) of the cover 202. In some of such aspects, the display 1202 may be the user-facing display 1102 of FIG. 11A (e.g., a flexible display). In other of such aspects, the display 1202 may not be specifically configured for flexibility (e.g., a flat screen display, LCD, LED, and/or the like).

Figure 12B:
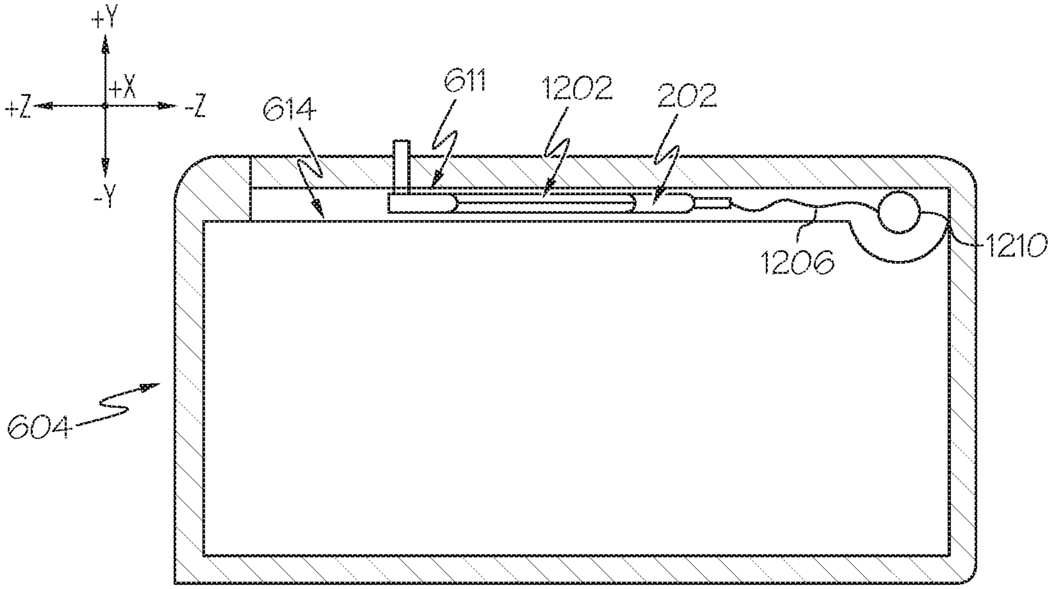
FIG. 12B depicts a cross-sectional view, along axis G-G, of the illustrative armrest storage system of FIG. 12A, where the housing includes a wire control device, according to one or more embodiments shown and described herein.

FIG. 12B depicts a cross-sectional view, along axis G-G, of the illustrative armrest storage system of FIG. 12A, where the housing 604 includes a wire control device 1210, according to various aspects described herein. Referring to FIG. 12B, the wire control device 1210 may be positioned in a proximal portion (e.g., in the −z direction of the coordinate axes of FIG. 12B) of the first cover receiving cavity 614 defined in the top portion (e.g., in the +y direction of the coordinate axes of FIG. 12B) of the housing 604. In light of FIG. 12B, as a first end 611 of the cover 202 is translated (e.g., via manual, assisted, and/or automated operation) proximally (e.g., in a −z direction of the coordinate axes of FIG. 12B) the wire control device 1210 may be configured to rotatingly retract any slack in the wire 1206 (e.g., to avoid wire 1206 tangle). Similarly, as the first end 611 of the cover 202 is translated (e.g., via manual, assisted, and/or automated operation) distally (e.g., in a +z direction of the coordinate axes of FIG. 12B) the wire control device 1210 may be configured to rotatingly release the wire 1206 such that slack in the wire 1206 is minimized. Furthermore, in light of FIG. 12B, since the cover 202 does not flex, the display 1202 may not be configured to flex as the cover 202 is translated proximally and/or distally (e.g., a flat screen display, LCD, LED, and/or the like).

Figure 13A:
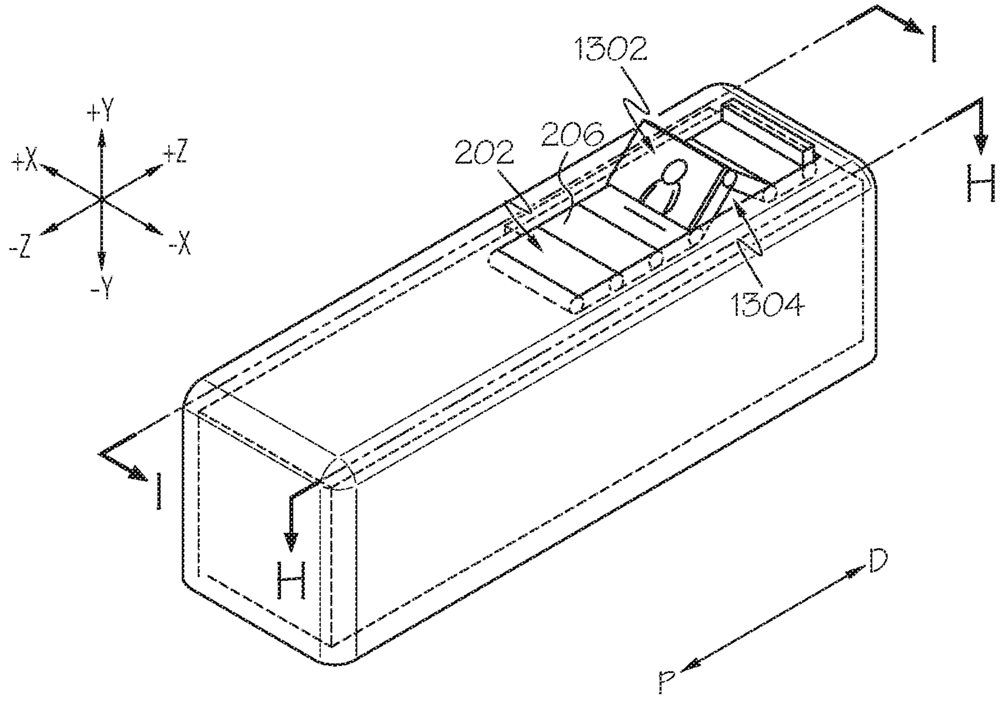
FIG. 13A depicts a perspective view of the illustrative armrest storage system of FIG. 12A, further including a flip-up user-facing display, according to one or more embodiments shown and described herein.

FIG. 13A depicts a perspective view of the illustrative armrest storage system of FIG. 12A, further including a flip-up display 1302, according to various aspects described herein. As described herein, the cover 202 may be defined by a plurality of coupled segments 206 and one or more than one segment of the plurality of segments 206 may define the flip-up display 1302. Referring to FIG. 13A, the cover 202 may be configured such that as it is translated distally (e.g., in a “D” direction, in the +z direction of the coordinate axes of FIG. 13A) a plurality of linkages 1304 cause a distal portion (e.g., in the +z direction of the coordinate axes of FIG. 13A) of the display 1302 to flip-up or rise (e.g., generally in the +y direction of the coordinate axes of FIG. 13A) relative to a plane (e.g., defined by the x and z coordinate axes of FIG. 13A) such that the display 1302 is user-facing (e.g., for a convenient, direct viewing angle relative to the wheelchair operator). Similarly, the cover 202 may be configured such that as it is translated proximally (e.g., in the “P” direction, in the −z direction of the coordinate axes of FIG. 13A) the plurality of linkages 1304 cause the distal portion (e.g., in the +z direction of the coordinate axes of FIG. 13A) of the display 1302 to flip-down or fall (e.g., generally in the −y direction of the coordinate axes of FIG. 13A) relative to a plane (e.g., defined by the x and z coordinate axes of FIG. 13A) such that the display 1302 is parallel relative to the plurality of segments 206 of the cover 202. Here, according to alternative aspects, it should be understood that the flip-up display 1302 may be configured to flip-up and/or flip-down manually (e.g., without the plurality of linkages 1304). In one aspect, a top portion of a segment 206 associated with the flip-up display 1302 may be configured to flip-up and/or flip down and the segment 206 associated with the flip-up display 1302 may include integrated struts (not shown, e.g., in the top portion and/or the bottom portion) that rotate out to prop up the flip-up display 1302 when in use and rotate in when not in use.

Figure 13B:
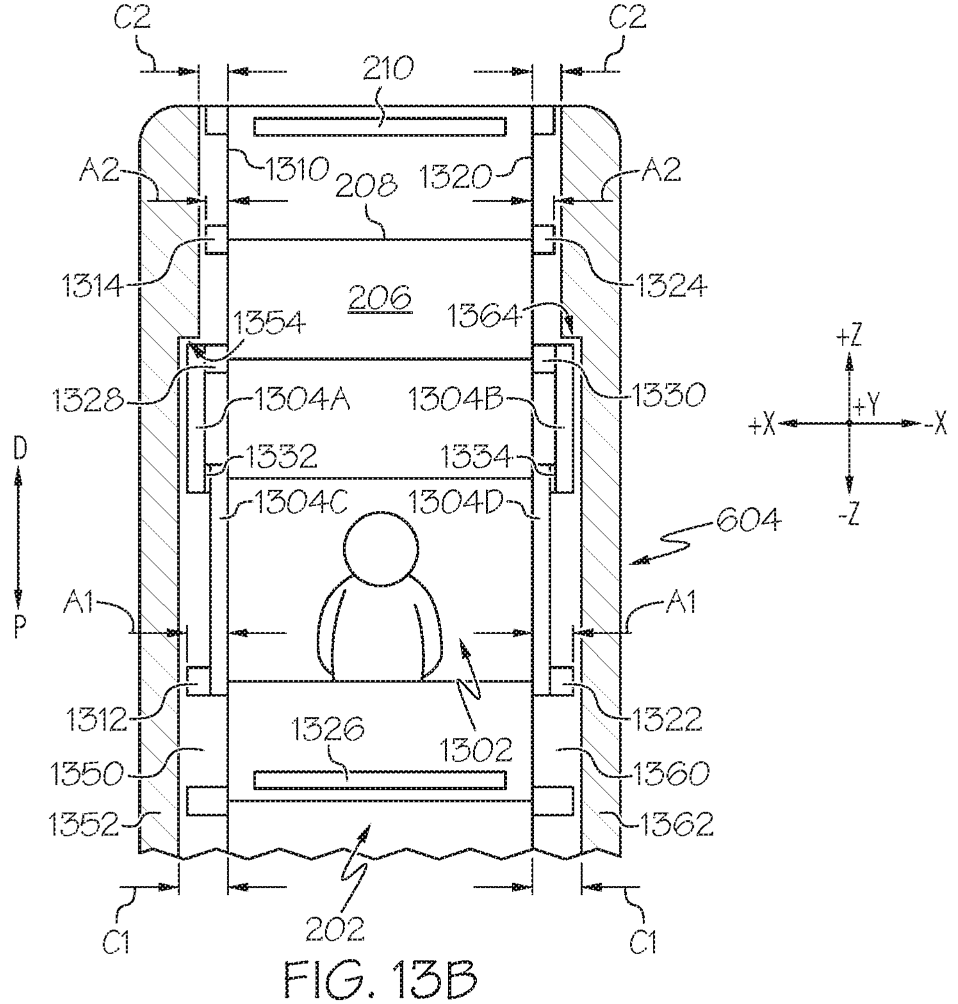
FIG. 13B depicts a portion of a top cross-sectional view, along axis H-H, of the illustrative armrest storage system of FIG. 13A, according to one or more embodiments shown and described herein.

FIG. 13B depicts a portion of a top cross-sectional view, along axis H-H, of the illustrative armrest storage system of FIG. 13A, according to various aspects described herein. Referring to FIG. 13B, a plurality of linkages 1304A, 1304B, 1304C, 1304D of the cover 202 may be configured to cause the display 1302 to flip-up as the cover 202 is translated distally (e.g., in the “D” direction, in the +z direction of the coordinate axes of FIG. 13B) and to flip-down as the cover 202 is translated proximally (e.g., in the “P” direction, in the −z direction of the coordinate axes of FIG. 13B).

In view of FIG. 13B (e.g., similar to FIG. 5C) the first cover receiving cavity 614 of the housing 604 (e.g., FIG. 12B) may be defined in part by a first flange 1350 on a first lateral side 1352 (e.g., in the +x direction of the coordinate axes of FIG. 13B) of the housing 604 and a second flange 1360 on a second lateral side 1362 (e.g., in the −x direction of the coordinate axes of FIG. 13B) of the housing 604. The first flange 1350 may be defined a depth "C1" within the first lateral side 1352 in a proximal portion (e.g., in the −z direction of the coordinate axes of FIG. 13B) of the housing 604 and a depth "C2" within the first lateral side 1352 in a distal portion (e.g., in the +z direction of the coordinate axes of FIG. 13B) of the housing 604. Similarly, the second flange 1360 may be defined a depth "C1" within the second lateral side 1362 in a proximal portion (e.g., in the −z direction of the coordinate axes of FIG. 13B) of the housing 604 and a depth "C2" within the second lateral side 1362 in a distal portion (e.g., in the +z direction of the coordinate axes of FIG. 13B) of the housing 604. In light of FIG. 13B, the width difference between the depth "C1" and the depth "C2" of the first flange 1350 may define a first wall 1354 on the first lateral side 1352 and a width difference between the depth "C1" and the depth "C2" of the second flange 1360 may define a second wall 1364 on the second lateral side 1362.

Further in view of FIG. 13B (e.g., similar to FIG. 5A), each of the plurality of segments 206, that define a first lateral edge 1310 (e.g., in the +x direction of the coordinate axes of FIG. 13B) of the cover 202 may include a protrusion 1312 in a proximal portion (e.g., in the −z direction of the coordinate axes of FIG. 13B) of the cover 202 and a protrusion 1314 in a distal portion (e.g., in the +z direction of the coordinate axes of FIG. 13B) of the cover 202. Each protrusion 1312 may extend a length "A1" (e.g., corresponding to depth "C1" of the first lateral side 1352) from the first lateral edge 1310 (e.g., in the +x direction of the coordinate axes of FIG. 13B) and each protrusion 1314 may extend a length "A2" (e.g., corresponding to depth "C2" of the first lateral side 1352) from the first lateral edge 1310 (e.g., in the +x direction of the coordinate axes of FIG. 13B). Similarly, each of the plurality of segments 206, that define a second lateral edge 1320 (e.g., in the −x direction of the coordinate axes of FIG. 13B) of the cover 202 may include a protrusion 1322 in a proximal portion (e.g., in the −z direction of the coordinate axes of FIG. 13B) of the cover 202 and a protrusion 1324 in a distal portion (e.g., in the +z direction of the coordinate axes of FIG. 13B) of the cover 202. Each protrusion 1322 may extend a length "A1" (e.g., corresponding to depth "C1" of the second lateral side 1362) from the second lateral edge 1320 (e.g., in the −x direction of the coordinate axes of FIG. 13B) and each protrusion 1324 may extend a length "A2" (e.g., corresponding to depth "C2" of the second lateral side 1362) from the second lateral edge 1320 (e.g., in the −x direction of the coordinate axes of FIG. 13B). In some aspects, each protrusion 1312, 1314, 1322, 1324 may be a pin. According to some aspects, each protrusion 1312, 1314, 1322, 1324 may be located at the joints 208 between adjacent segments 206. According to other aspects, each protrusion 1312, 1314, 1322, 1324 may not be located at the joints 208 between adjacent segments 206 (e.g., located between the joints 208, and/or the like).

Still referring to FIG. 13B, the protrusions 1312 and 1322 of each segment 206 in the proximal portion (e.g., in the −z direction of the coordinate axes of FIG. 13B) of the cover 202 and the protrusions 1314 and 1324 of each segment 206 in the distal portion (e.g., in the +z direction of the coordinate axes of FIG. 13B) of the cover 202 may be configured to slidingly interface with the first flange 1350 of the first lateral side 1352 and the second flange 1360 of the second lateral side 1362 of the housing 604. According to various aspects, this may occur in at least three stages as described herein.

In a first stage, for example, the cover 202 may be translated, via actuator 210, to and/or toward a closed position. In the first stage, the protrusions 1314 and 1324 of the cover 202 may slidingly interface with a proximal portion (e.g., in the −z direction of the coordinate axes of FIG. 13B) of each of the first flange 1350 and the second flange 1360 as well as a distal portion (e.g., in the +z direction of the coordinate axes of FIG. 13B) of each of the first flange 1350 and the second flange 1360. Further, in the first stage, the protrusions 1312 and 1322 of the cover 202 may slidingly interface with the proximal portion (e.g., in the −z direction of the coordinate axes of FIG. 13B) of each of the first flange 1350 and the second flange 1360. As depicted in FIG. 13B, the cover 202 may be translated to a closed position (e.g., to a distal end of the housing 604). In view of FIG. 13B, in the closed position, protrusion 1328 may be positioned to interfere with and/or be seated against the first wall 1354 and protrusion 1330 may be positioned to interfere with and/or be seated against the second wall 1364.

In a second stage, for example, at the closed position, a portion of the cover 202 may be further translated distally (e.g., in the +z direction of the coordinate axes of FIG. 13B) to flip-up the display 1302. In particular, in the second stage, a plurality of segments 206 in the proximal portion (e.g., in the −z direction of the coordinate axes of FIG. 13B) of the cover 202 may be translated, via a secondary actuator 1326, distally (e.g., in a "D" direction, in the +z direction of the coordinate axes of FIG. 13B). The secondary actuator may include a cavity defined in a segment 206 in the proximal portion (e.g., in the −z direction of the coordinate axes of FIG. 13B) of the cover 202 (e.g., a protrusion may be avoided, in some aspects, for wheelchair operator comfort).

Figure 13C:
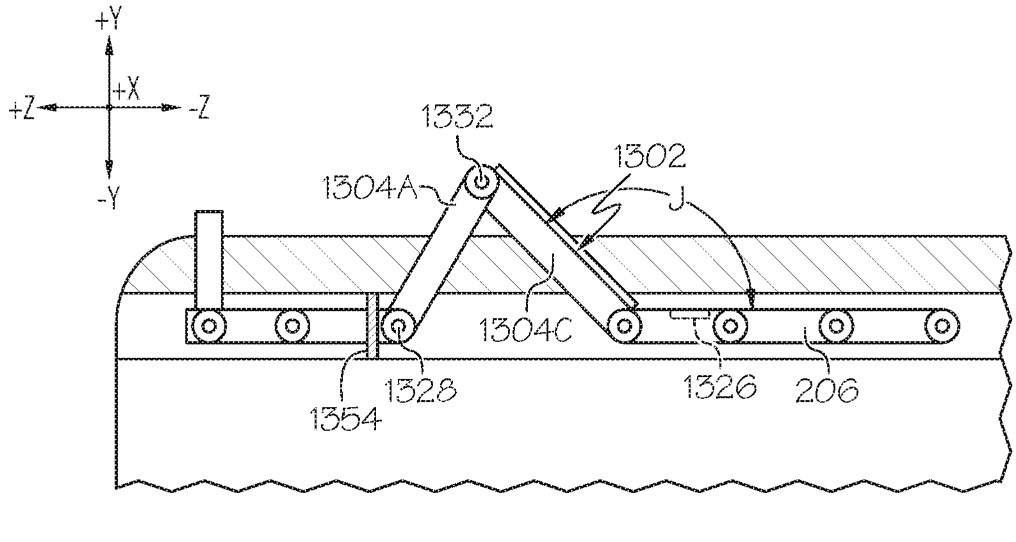
FIG. 13C depicts a cross-sectional view, along axis I-I, of the illustrative armrest storage system of FIG. 13A, where the cover is translated distally to flip-up the display, according to one or more embodiments shown and described herein.

FIG. 13C depicts a cross-sectional view, along axis I-I, of the illustrative armrest storage system of FIG. 13A, where the cover 202 is translated distally to flip-up the display 1302, according to various aspects of the present disclosure. Referring to FIG. 13C, in light of FIG. 13B, as the plurality of segments 206 in the proximal portion (e.g., in the −z direction of the coordinate axes of FIG. 13C) of the cover 202 are translated distally (e.g., via the secondary actuator 1326) the protrusion 1328 may interfere with and/or seat against the first wall 1354 such that the linkage 1304A rotates (e.g., in a counter-clockwise direction about protrusion 1328 as depicted in FIG. 13C) and the linkage 1304C rotates (e.g., in a clockwise direction about protrusion 1332 as depicted in FIG. 13C) to flip-up the display 1302. Similarly, in view of FIG. 13B, the protrusion 1330 may interfere with and/or seat against the second wall 1364 such that the linkage 1304B rotates about protrusion 1330 and the linkage 1304D rotates about protrusion 1334 to flip-up the display 1302. In light of FIG. 13C, the viewing angle "J" may be a function of the amount by which the cover is translated distally at the second stage. Accordingly, the viewing angle "J" of the display may be user-defined (e.g., to wheelchair operator viewing comfort).

In a third stage, for example, at a further distally translated position (e.g., the second stage) a portion of the cover 202 may be translated proximally (e.g., in the −z direction of the coordinate axes of FIG. 13C) to flip-down the display 1302. In particular, in the third stage, a plurality of segments 206 in the proximal portion (e.g., in the −z direction of the coordinate axes of FIG. 13C) of the cover 202 may be translated, via the secondary actuator 1326, proximally (e.g., in the −z direction of the coordinate axes of FIG. 13C). In light of FIG. 13C, as the plurality of segments 206 in the proximal portion (e.g., in the −z direction of the coordinate axes of FIG. 13C) of the cover 202 are translated proximally (e.g., via the secondary actuator 1326) the linkage 1304C may rotate (e.g., in a counter-clockwise direction about protrusion 1332) and the linkage 1304A may rotate (e.g., in a clockwise direction about protrusion 1328) to flip-down the display 1302. Similarly, in view of FIG. 13B, the linkage 1304D may rotate about protrusion 1334 and the linkage 1304B may rotate about protrusion 1330 to flip-down the display 1302. Similar to the second stage, the viewing angle "J" may be a function of the amount by which the cover is translated proximally at the third stage. Accordingly, the viewing angle "J" of the display may be user-defined (e.g., to wheelchair operator viewing comfort).

Figure 13D:
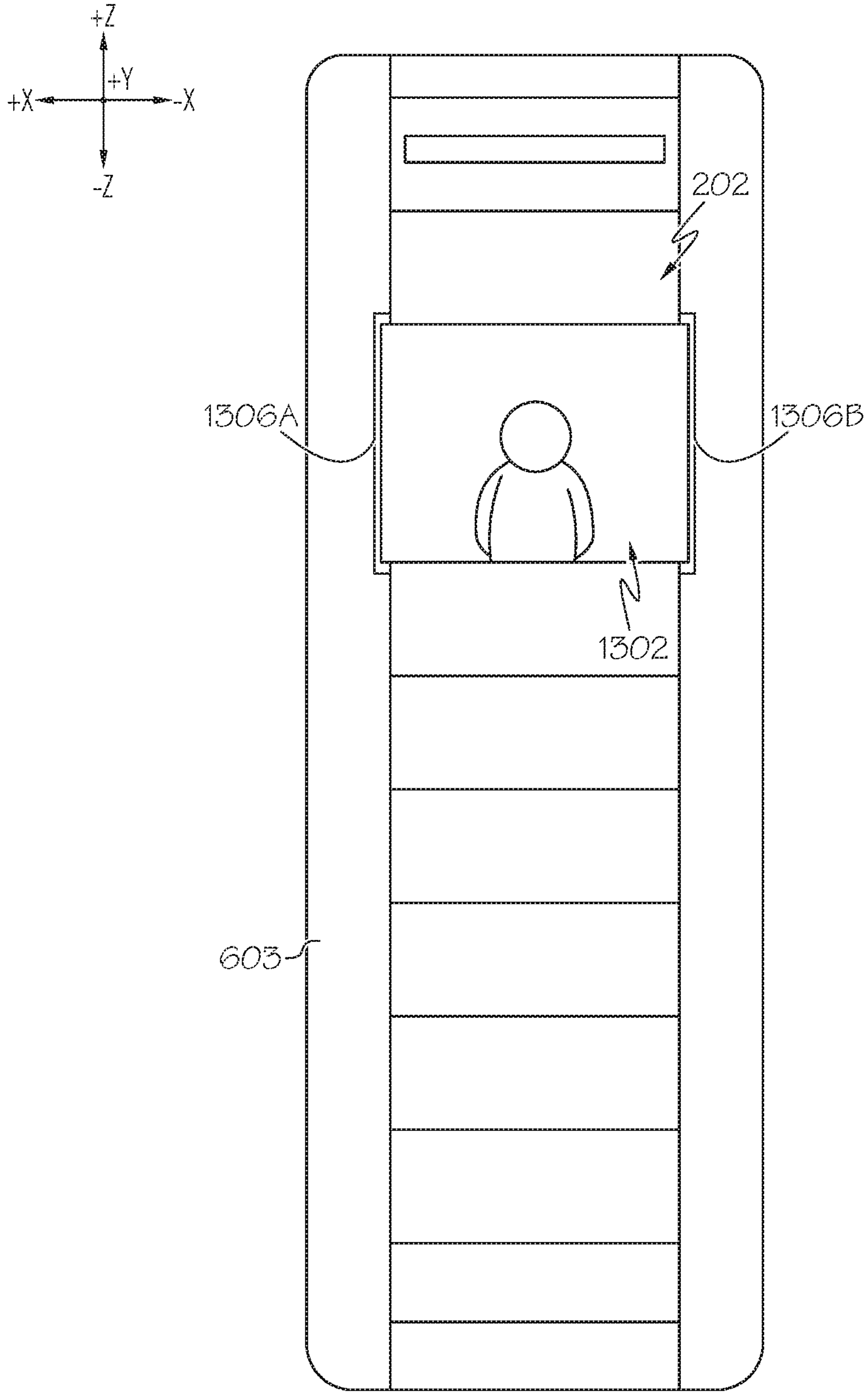
FIG. 13D depicts a top plan view of the illustrative flip-up display of FIG. 13A, according to one or more embodiments shown and described herein.

FIG. 13D depicts a top plan view of the illustrative flip-up display 1302 of FIG. 13A, according to various aspects described herein. Referring to FIG. 13D, according to various aspects, display cutouts 1306A, 1306B may be defined in the pad 603 positioned on both sides (e.g., in the −x and +x direction of the coordinate axes of FIG. 13D) of the cover 202. The display cutouts 1306A, 1306B may be configured to accommodate movement (e.g., rotation, translation, and/or the like) of the plurality of linkages 1304A-1304D (see FIGS. 13B-13C) that flip-up the display 1302 (e.g., the second stage) as the cover 202 is translated distally (e.g., in the +z direction of the coordinate axes of FIG. 13D) and flip-down the display 1302 (e.g., the third stage) as the cover 202 is translated proximally (e.g., in the −z direction of the coordinate axes of FIG. 13D).

It should now be understood that the systems described herein encompass various wheelchair armrest storage systems that each include one or more than one cover configured to selectively open and close assess to one or more than one storage area defined in a housing. In particular, the various wheelchair armrest storage systems described herein include at least one cover that is translated, via manual, assisted and/or automated operation, to selectively open and close access to at least one storage area. Furthermore, various wheelchair armrest storage systems described herein may include a cover that is removable, lockable, and/or includes a user-facing display.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A wheelchair armrest storage system, comprising:
- a housing for a wheelchair, wherein:
  - the housing includes a proximal portion, a distal portion, a first lateral side, and a second lateral side;
  - the housing extends longitudinally between the proximal portion and the distal portion; and
  - at least one cover receiving cavity is defined in each of the first lateral side and the second lateral side;
- a storage area defined within the housing; and
- a cover configured to translate in a direction between the proximal portion and the distal portion within each of the at least one cover receiving cavity defined in each of the first lateral side and the second lateral side.

2. The system of claim 1, wherein the cover is defined by a plurality of coupled segments.

3. The system of claim 1, wherein the housing further includes a top surface, wherein the top surface defines an opening to the storage area, and wherein a pad is defined on the top surface on a first lateral side of the opening and a second lateral side of the opening.

4. The system of claim 1, wherein the housing further includes a top portion, wherein a first cover receiving cavity is defined in the top portion of the housing in each of the first lateral side and the second lateral side, and wherein the cover is configured to translate longitudinally within the first cover receiving cavity of the first lateral side and the first cover receiving cavity of the second lateral side.

5. The system of claim 4, wherein:
- a second cover receiving cavity is defined in the proximal portion of the housing in each of the first lateral side and the second lateral side, the second cover receiving cavity of the first lateral side communicatively coupled to the first cover receiving cavity of the first lateral side and the second cover receiving cavity of the second lateral side communicatively coupled to the first cover receiving cavity of the second lateral side; and
- a proximal end of the cover is configured to translate:
  - from the first cover receiving cavity into the second cover receiving cavity on each of the first lateral side and the second lateral side as a distal end of the cover is translated proximally from a closed position toward an open position; and
  - from the second cover receiving cavity into the first cover receiving cavity on each of the first lateral side and the second lateral side as the distal end cover is translated distally from the open position toward the closed position.

6. The system of claim 5, wherein:
- the housing further includes a bottom portion;
- a third cover receiving cavity is defined in the bottom portion of the housing in each of the first lateral side and the second lateral side, the third cover receiving cavity of the first lateral side communicatively coupled to the second cover receiving cavity of the first lateral side and the third cover receiving cavity of the second lateral side communicatively coupled to the second cover receiving cavity of the second lateral side; and
- the proximal end of the cover is configured to translate:
  - from the first cover receiving cavity into the second cover receiving cavity and into the third cover receiving cavity on each of the first lateral side and the second lateral side as the distal end of the cover is translated proximally from the closed position toward the open position; and
  - from the third cover receiving cavity into the second cover receiving cavity and into the first cover receiving cavity on each of the first lateral side and the second lateral side as the distal end of the cover is translated distally from the open position toward the closed position.

7. The system of claim 4, wherein:
- the housing further defines an opening to the storage area; and
- the first cover receiving cavity of the first lateral side and the first cover receiving cavity of the second lateral side are configured such that the cover is removable through the opening.

8. The system of claim 1, wherein a distal end of the cover includes a first part of a locking mechanism, the housing includes a second part of the locking mechanism, and the first part of the locking mechanism is configured to interact with the second part of the locking mechanism, when the cover is in the closed position, to prevent access to the storage area.

9. The system of claim 1, further comprising a cover pad, wherein at least one cover pad receiving cavity is defined in each of the first lateral side and the second lateral side, and the cover pad is configured to translate longitudinally within each of the at least one cover pad receiving cavity to pad the cover when the cover is in a closed position or a partially closed position.

10. The system of claim 1, further comprising a device configured to at least one of automate or assist the longitudinal translation of the cover.

11. The system of claim 10, wherein the device comprises at least one of a mechanical device, a cylinder and rod device, or a motorized device.

12. The system of claim 1, wherein the cover includes a flexible display configured to depict at least one of images or information.

13. The system of claim 12, wherein the flexible display is an organic light-emitting diode display, an organic liquid crystal display, or an electronic paper display.

14. The system of claim 1, wherein the cover is defined by a plurality of coupled segments, and wherein one or more than one segment define a display configured to depict at least one of images or information on the cover.

15. The system of claim 14, wherein:

as the cover is translated distally, a plurality of linkages are configured to cause a distal portion of the display to flip-up or rise relative to a top surface of the housing; and as the cover is translated proximally the plurality of linkages are configured to cause the distal portion of the display to flip-down or fall relative to the top surface of the housing.

16. The system of claim 15, wherein:

each of the plurality of segments include:

a protrusion extending from a first lateral edge of the cover; and a protrusion extending from a second lateral edge of the cover; and a first protrusion extending from the first lateral edge of the cover is arranged to slidingly interfere with a first wall defined in the first lateral side of the housing, and a second protrusion extending from the second lateral edge of the cover is arranged to slidingly interfere with a second wall defined in the second lateral side of the housing to cause the plurality of linkages to flip-up the display as a proximal portion of the cover is translated distally.

17. A wheelchair armrest storage system, comprising:

a housing for a wheelchair, wherein:

the housing includes a proximal portion, a distal portion, a first lateral side, and a second lateral side;

the housing extends longitudinally between the proximal portion and the distal portion;

a plurality of cover receiving cavities are defined in a proximal portion of each of the first lateral side and the second lateral side; and a plurality of cover receiving cavities are defined in a distal portion of each of the first lateral side and the second lateral side;

a first storage area defined within the proximal portion of the housing;

a first cover configured to translate between the proximal portion and the distal portion of the housing within the plurality of cover receiving cavities defined in the proximal portion of each of the first lateral side and the second lateral side;

a second storage area defined within the distal portion of the housing; and a second cover configured to translate between the proximal portion and the distal portion of the housing within the plurality of cover receiving cavities defined in the distal portion of each of the first lateral side and the second lateral side.

18. The system of claim 17, wherein the housing further includes a top surface, wherein the top surface defines a first opening to the first storage area and a second opening to the second storage area, and wherein a pad is defined on the top surface on a first lateral side of the first and the second opening, on a second lateral side of the first and the second opening, and in-between the first and the second opening.

19. A wheelchair armrest subassembly, comprising:

a wheelchair armrest storage system, including:

a housing, wherein:

the housing includes a proximal portion, a distal portion, a first lateral side, and a second lateral side;

the housing extends longitudinally between the proximal portion and the distal portion; and at least one cover receiving cavity is defined in each of the first lateral side and the second lateral side;

a storage area defined within the housing; and a cover configured to translate between the proximal portion and the distal portion of the housing within each of the at least one cover receiving cavity defined in each of the first lateral side and the second lateral side;

wherein the wheelchair armrest subassembly is configured to couple to a wheelchair by attaching to an armrest of the wheelchair or by replacing the armrest of the wheelchair.

20. The subassembly of claim 19, further comprising:

one or more than one bracket couplable to the housing, the one or more than one bracket positioned and configured to attach the wheelchair armrest storage system to the armrest of the wheelchair; or one or more than one frame tube couplable to the housing, the one or more than one frame tube positioned and configured to replace the armrest of the wheelchair.

* * * * *